(12) United States Patent
Johnson et al.

(10) Patent No.: US 12,057,690 B2
(45) Date of Patent: Aug. 6, 2024

(54) ADJUSTABLE-DEPTH RING ASSEMBLY AND METHOD OF INSTALLATION

(71) Applicant: Eaton Intelligent Power Limited, Dublin (IE)

(72) Inventors: Jacob Lee Johnson, Highland, IL (US); David Charles Brooks, Greenville, IL (US); Harpreet Singh Tuteja, Pune (IN)

(73) Assignee: EATON INTELLIGENT POWER LIMITED, Dublin (IE)

( * ) Notice: Subject to any disclaimer, the term of this patent is extended or adjusted under 35 U.S.C. 154(b) by 133 days.

(21) Appl. No.: 17/524,896

(22) Filed: Nov. 12, 2021

(65) Prior Publication Data

US 2022/0158431 A1    May 19, 2022

Related U.S. Application Data

(60) Provisional application No. 63/131,890, filed on Dec. 30, 2020.

(51) Int. Cl.
*H02G 3/14* (2006.01)
*H02G 3/12* (2006.01)

(52) U.S. Cl.
CPC .............. *H02G 3/14* (2013.01); *H02G 3/123* (2013.01)

(58) Field of Classification Search
CPC ............ H02G 3/08; H02G 3/081; H02G 3/12; H02G 3/086; H02G 3/10; H02G 3/14; H02G 3/123; H01R 13/746; H01R 13/53; H01R 13/533; H01R 13/46; Y10T 29/49826

USPC .................. 174/50, 53, 57, 58, 480, 481; 220/3.2–3.9, 4.02; 248/906
See application file for complete search history.

(56) References Cited

U.S. PATENT DOCUMENTS

| | | | |
|---|---|---|---|
| 5,931,325 A | 8/1999 | Dimitrov | |
| 6,820,760 B2 | 11/2004 | Wegner et al. | |
| 7,189,928 B2 | 3/2007 | Denier | |
| 7,301,099 B1* | 11/2007 | Korcz | H02G 3/14 174/67 |
| 7,468,486 B2 | 12/2008 | Yan | |
| 7,495,170 B2* | 2/2009 | Dinh | H02G 3/14 174/67 |
| 7,531,583 B2 | 5/2009 | Desai | |
| 7,531,743 B2* | 5/2009 | Johnson | H02G 3/081 174/53 |
| 7,572,977 B2 | 8/2009 | Gorman | |
| 8,575,484 B1 | 11/2013 | Witherbee | |
| 8,658,894 B1 | 2/2014 | Witherbee | |
| 8,987,593 B2* | 3/2015 | Korcz | H02G 3/086 174/58 |
| 9,252,579 B2* | 2/2016 | Korcz | H02G 3/08 |
| 9,502,874 B2* | 11/2016 | Gagne | H02G 3/14 |
| 11,557,888 B2* | 1/2023 | Phillips | H02G 3/081 |
| 2014/0202758 A1* | 7/2014 | Lolachi | H02G 3/123 174/481 |

\* cited by examiner

*Primary Examiner* — Angel R Estrada
(74) *Attorney, Agent, or Firm* — Stinson LLP

(57) ABSTRACT

The present disclosure is directed to an adjustable-depth ring assembly for connection to an electrical box that is accessible through a wall opening in a wall member disposed forward of the electrical box. The assembly generally comprises a cover plate having a planar rigid plate and a raised portion, and an extension ring. A method of installing the assembly is also provided herein.

20 Claims, 40 Drawing Sheets

ADJUSTABLE-DEPTH RING ASSEMBLY AND METHOD OF INSTALLATION

CROSS-REFERENCE TO RELATED APPLICATIONS

This application claims the benefit of U.S. provisional Application No. 63/131,890, filed Dec. 30, 2020 and claims priority to India Patent Application No. 202011049643, filed Nov. 13, 2020, the contents of each of which is incorporated by reference in their entirety.

FIELD

The present invention generally relates to the installation of electrical devices (e.g., switches, outlets, telephone jacks, and computer jacks) in an electrical junction box mounted in a wall.

BACKGROUND

The conventional process for installing an electrical device, e.g., a light switch, outlet, or telephone/computer jack, in a junction box involves mounting the junction box on a wall stud before the drywall in installed, mounting the electrical device on a box cover plate (often referred to as a "mud ring"), connecting the wiring of the device to the wiring in the junction box, securing the box cover plate and the device to the junction box, and attaching a cover plate to the electrical device to cover and protect the assembly. The drywall (or other type of wall) is installed at a later time, sometimes days or even weeks or months later. An opening is cut in the drywall to reveal the electrical device.

The above process has drawbacks. For example, if the thickness of the drywall is changed after installation of the electrical device, the mud rings must be replaced. Further, the electrical device must be installed at an early stage of the process, even though there may be a substantial delay before the installation process is finally finished. The purchase of materials, including expensive electrical devices, long before they are actually ready for use is undesirable from the standpoint of cash flow, especially where a job requires many such devices. Also, there may be design changes after the dry wall is installed, such as a change in the type of finish cover plate to be used, which can affect the configuration of the electrical device. There is also a risk of damage to the electrical device prior to and during installation and trim-up of the dry wall. In such cases the installed electrical device may have to be replaced by a substitute device, which is a costly process. Attempts have been made to solve some of these problems by using adjustable-depth mud rings and junction boxes, as described for example, in U.S. Pat. Nos. 7,572,977, 7,531,583, 7,468,486, 7,189,928, 6,820,760, and 5,931,325. However, the adjustment of these components typically requires the use of multiple threaded screws, the manipulation of which is inconvenient and time-consuming. Moreover, the adjustability of these components does not address all of the problems arising from last-minute design changes and/or a substantial delay between the time the electrical devices are installed and the time they are actually ready to use, nor the risk of damage to the electrical device prior to completion of the drywall installation and trim-up process.

SUMMARY

The present disclosure generally relates to an adjustable-depth ring assembly for connection to an electrical box that is accessible through a wall opening in a wall member disposed forward of the electrical box, the assembly comprising a cover plate configured for attachment to the electrical box, the cover plate including a planar rigid plate and a raised portion projecting laterally from the rigid plate and defining an opening; and an extension ring sized for reception in the opening of a box cover plate to couple the extension ring to the cover plate, said extension ring defining a cavity, the extension ring being movable relative to the cover plate along an axis extending in front-to-back direction such that an axial distance between a front of the extension ring and the box cover plate can be adjusted to accommodate wall members of different thicknesses.

The present disclosure also relates to a method of installing the assembly, the method comprising attaching the box cover plate to an electrical box, said electrical box and box cover plate being disposed behind said wall member such that the raised portion of the box cover plate presses against an inner surface of the wall member producing a bulging area of the wall member; and cutting a hole in the wall member around the bulging area of the wall member to expose the opening of the box cover plate.

The present disclosure further relates to a box cover plate assembly for use in an adjustable-depth ring assembly for connection to an electrical box that is accessible through a wall opening in a wall member disposed forward of the electrical box, the box cover plate assembly comprising a planar rigid plate defining holes for receiving fasteners for attaching the box cover plate to the electrical box; and a cover attachable to the planar rigid plate, the cover comprising a sleeve portion projecting forwardly from the planar rigid plate when the cover is attached to the planar rigid plate, and a removable faceplate extending across a back of the sleeve portion.

BRIEF DESCRIPTION OF THE DRAWINGS

Corresponding reference characters indicate corresponding parts throughout the drawings.

DETAILED DESCRIPTION

Figure 17:
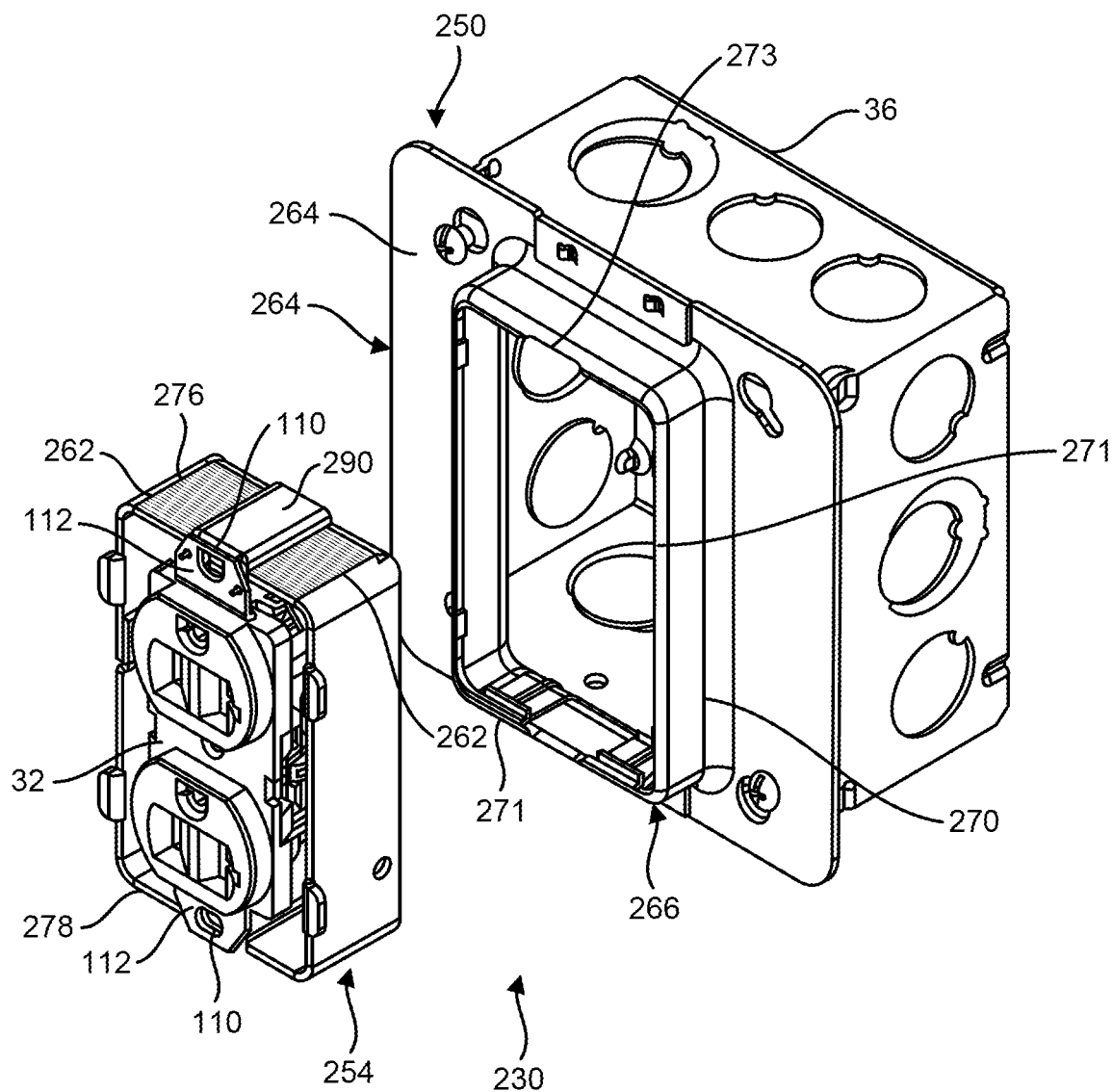
FIG. 17 is an exploded view of another embodiment of an adjustable-depth ring assembly showing an electrical device attached to an extension ring of the ring assembly.
Figure 18:
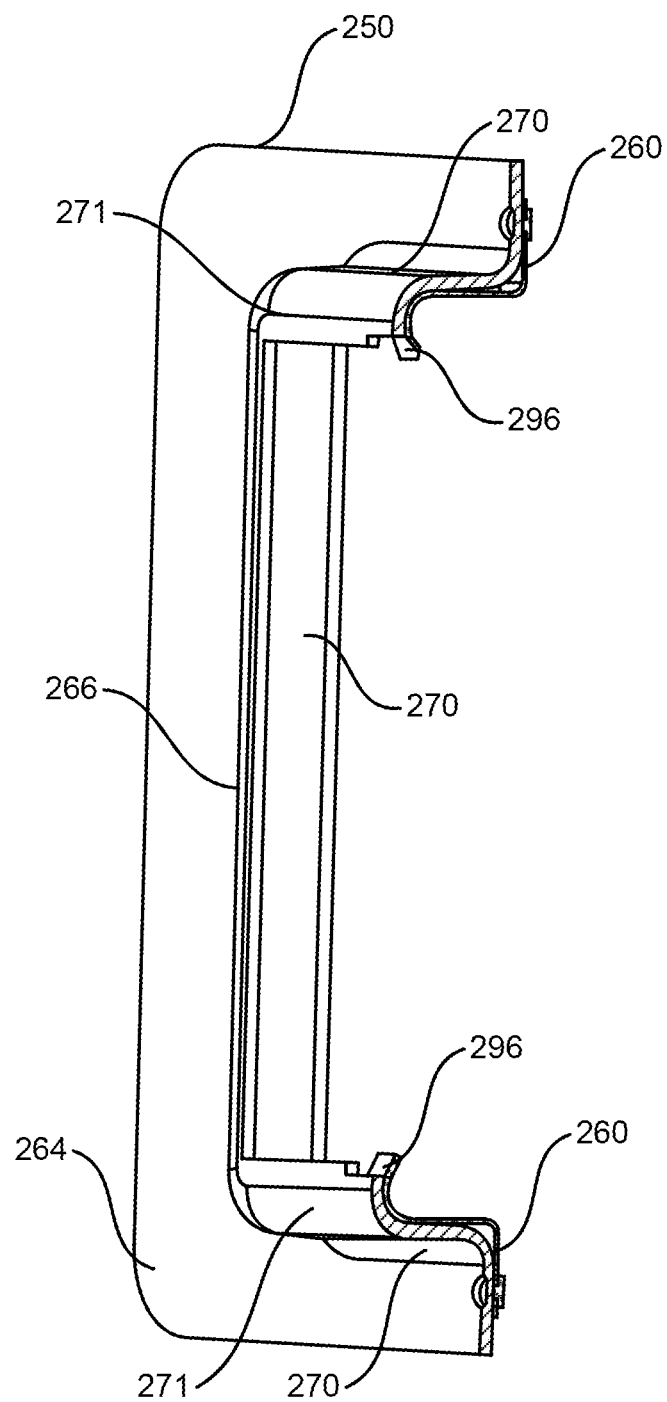
FIG. 18 is a perspective of a box cover plate and spring clip of the ring assembly in FIG. 17.
Figure 19:
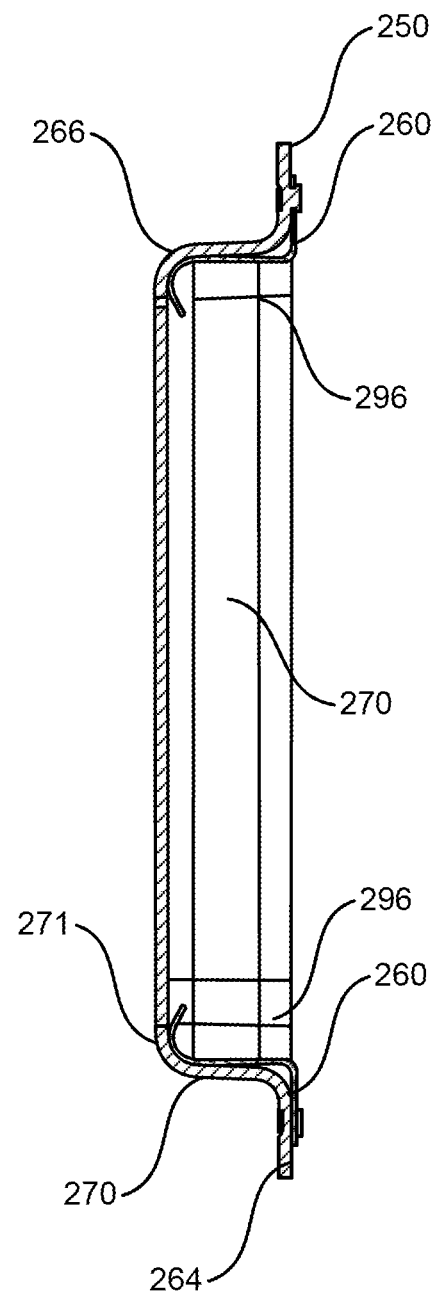
FIG. 19 is a section of the box cover plate and spring clip of the ring assembly in FIG. 17.
Figure 20:
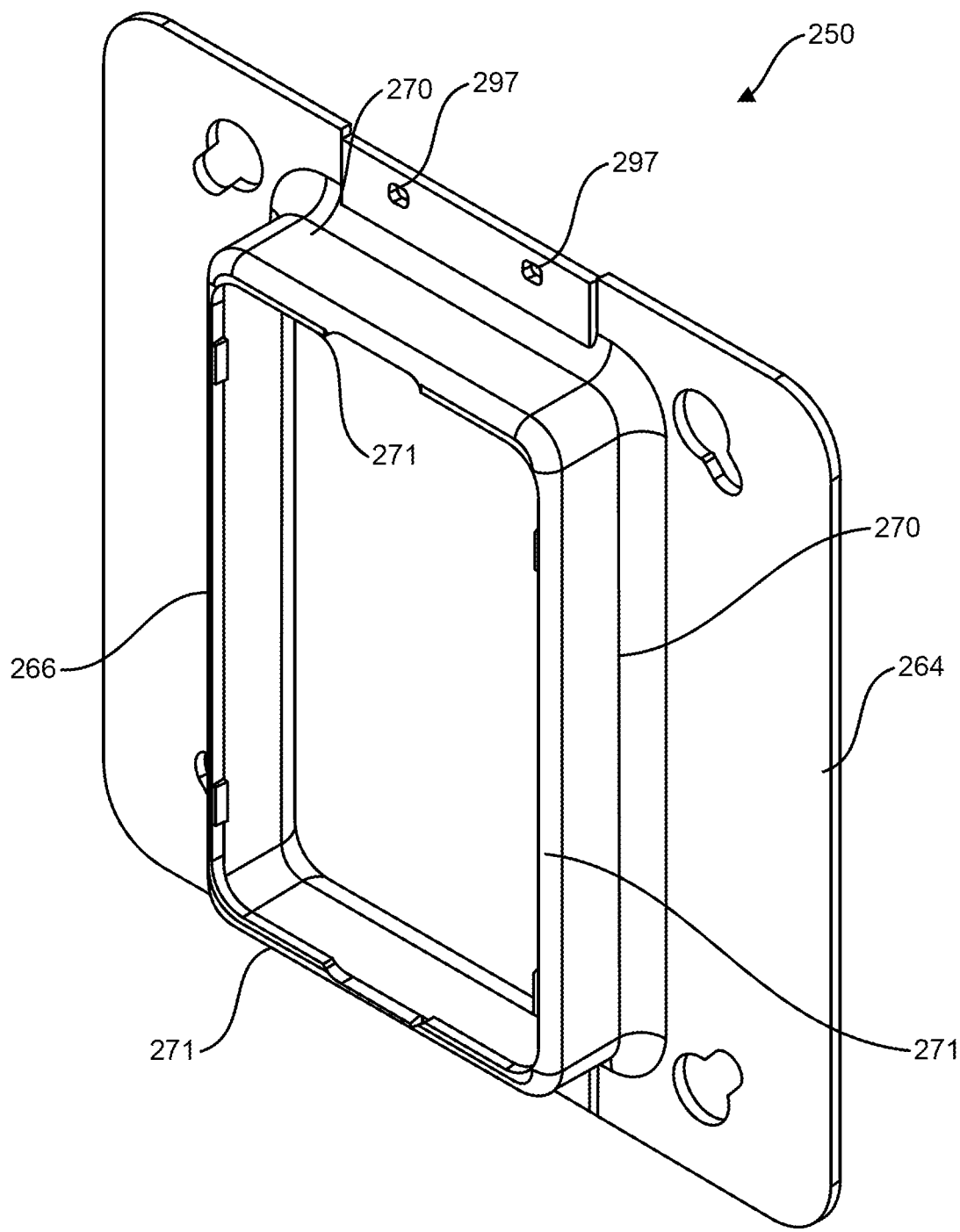
FIG. 20 is a perspective view of the box cover plate of the ring assembly in FIG. 17.
Figure 21:
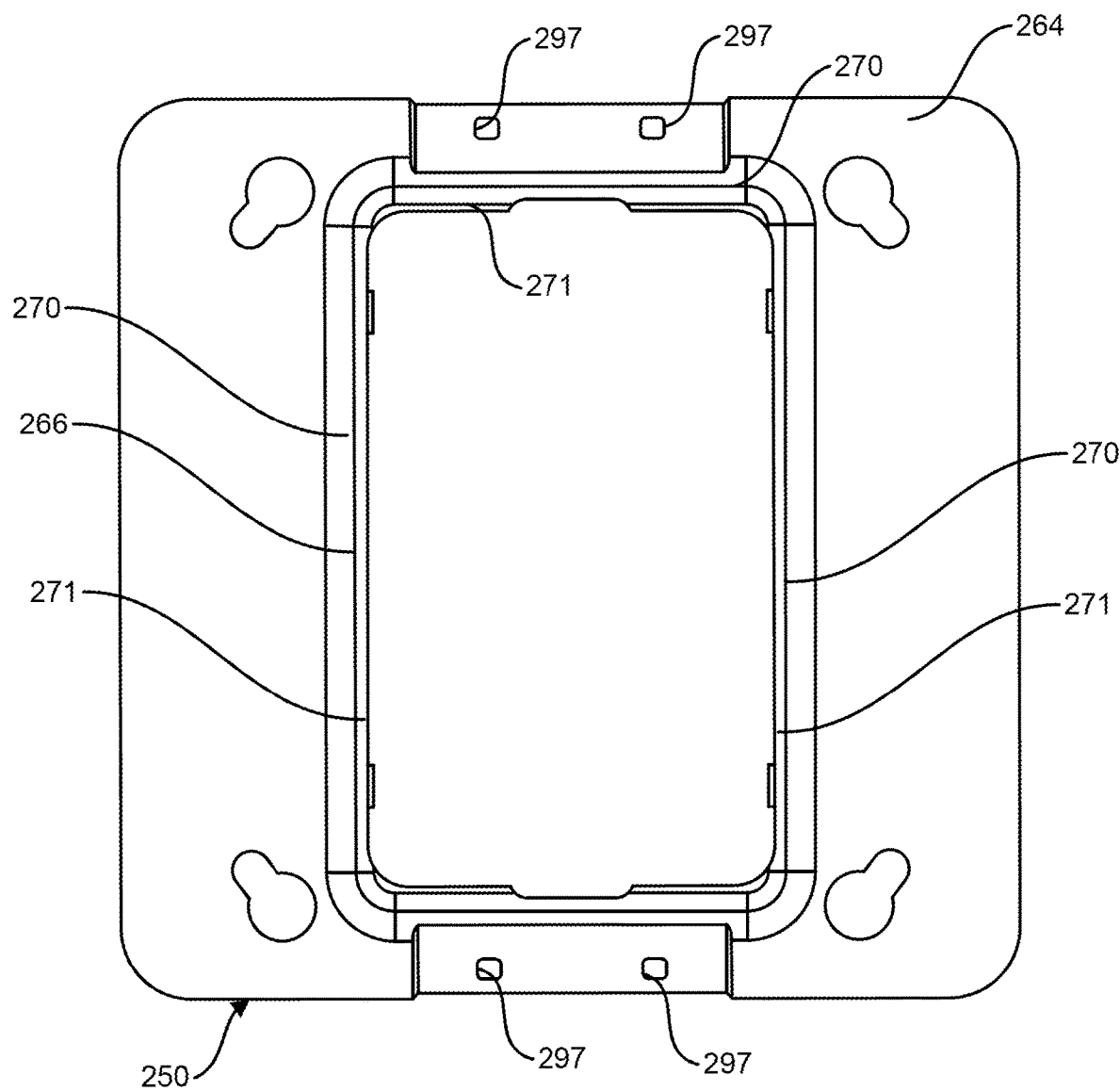
FIG. 21 is a front view of the box cover plate in FIG. 20.
Figure 22:
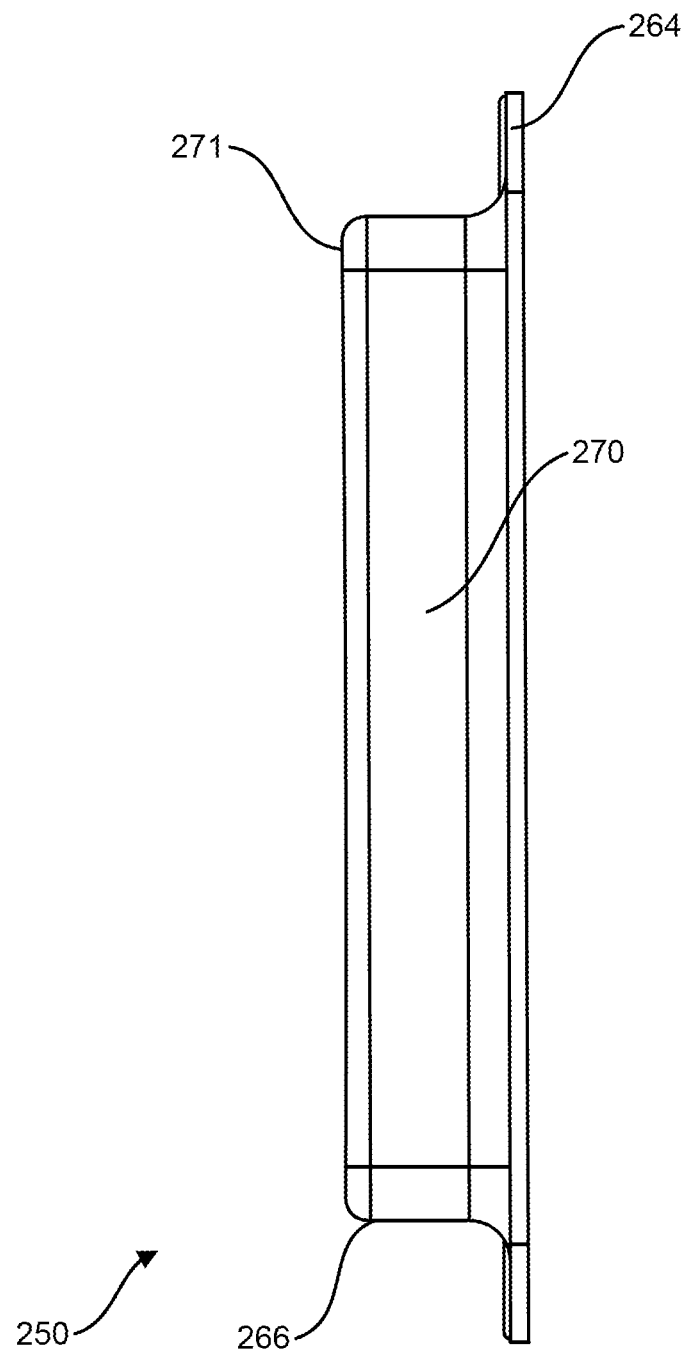
FIG. 22 is a side view of the box cover plate in FIG. 20.
Figure 23:
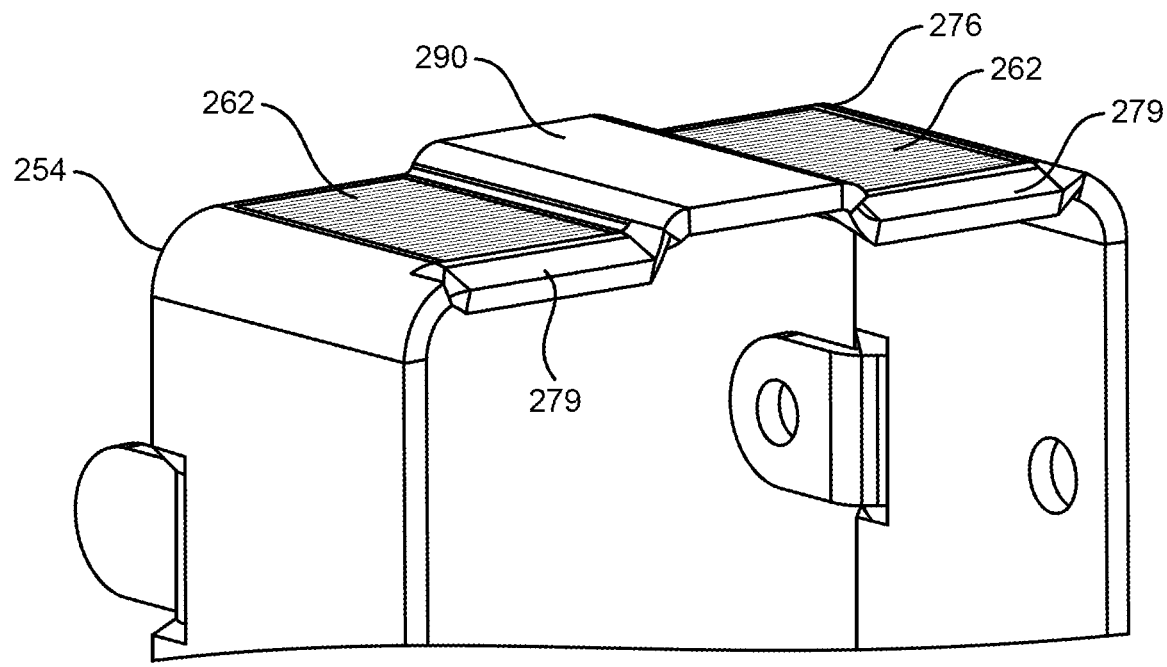
FIG. 23 is a fragmentary perspective of the extension ring of the ring assembly in FIG. 17.
Figure 24:
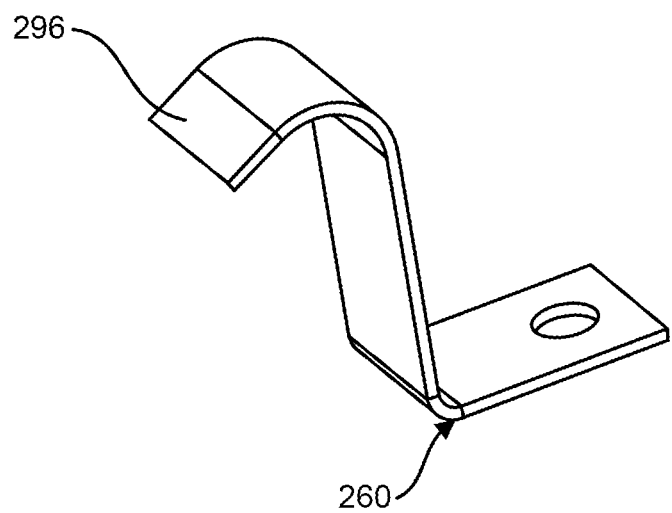
FIG. 24 is a perspective of a spring clip of the ring assembly in FIG. 17.

Referring to FIGS. 1-6, an adjustable-depth ring assembly of this invention, generally designated 30. The assembly 30 is used for mounting an electrical device 32 (see FIG. 17) such as a switch, outlet, jack, etc., in an electrical junction box 36 (hereinafter referred to as an electrical box, or junction box, or simply box) that is accessible through a wall opening in a wall member (not shown) disposed forward of the box. The electrical box 36 illustrated in FIG. 3 has a front opening 38 and a cavity 40 that are sized for receiving two electrical devices 32 positioned side-by-side, but this number may vary from one to two, three, four or more devices, as will be understood by those skilled in this field. The box 36 is generally rectangular as illustrated but may have other shapes.

In general, the adjustable-depth ring assembly 30 comprises a box cover plate 50 sized to fit the electrical box 36 and an extension ring 54 received in a central opening 56 of the box cover plate. The extension ring 54 is movable in the opening 56 relative to the box cover plate 50 along a central axis CA extending in a front-to-back direction such that an axial distance between a front 58 of the extension ring and the box cover plate can be adjusted to accommodate wall members of different thicknesses. Spring clips 60 are attached to the box cover plate 50 and are configured for engaging grooves 62 on the extension ring 54. The spring clips 60 are operable to allow the extension ring 54 to be pushed in a rearward direction relative to the box cover plate 50 to an installed position in which the front 58 of the extension ring is generally flush with a front surface of a wall member. The spring clips 60 are also operable to resist movement of the extension ring 54 in a forward direction away from the installed position. (As used herein, movement in the "forward" direction is movement along axis CA toward the left in FIG. 3, and movement in the "rearward" direction is movement along axis CA toward the right in FIG. 3.) Each of the elements of the assembly 30 and its operation are described below.

Figure 7:
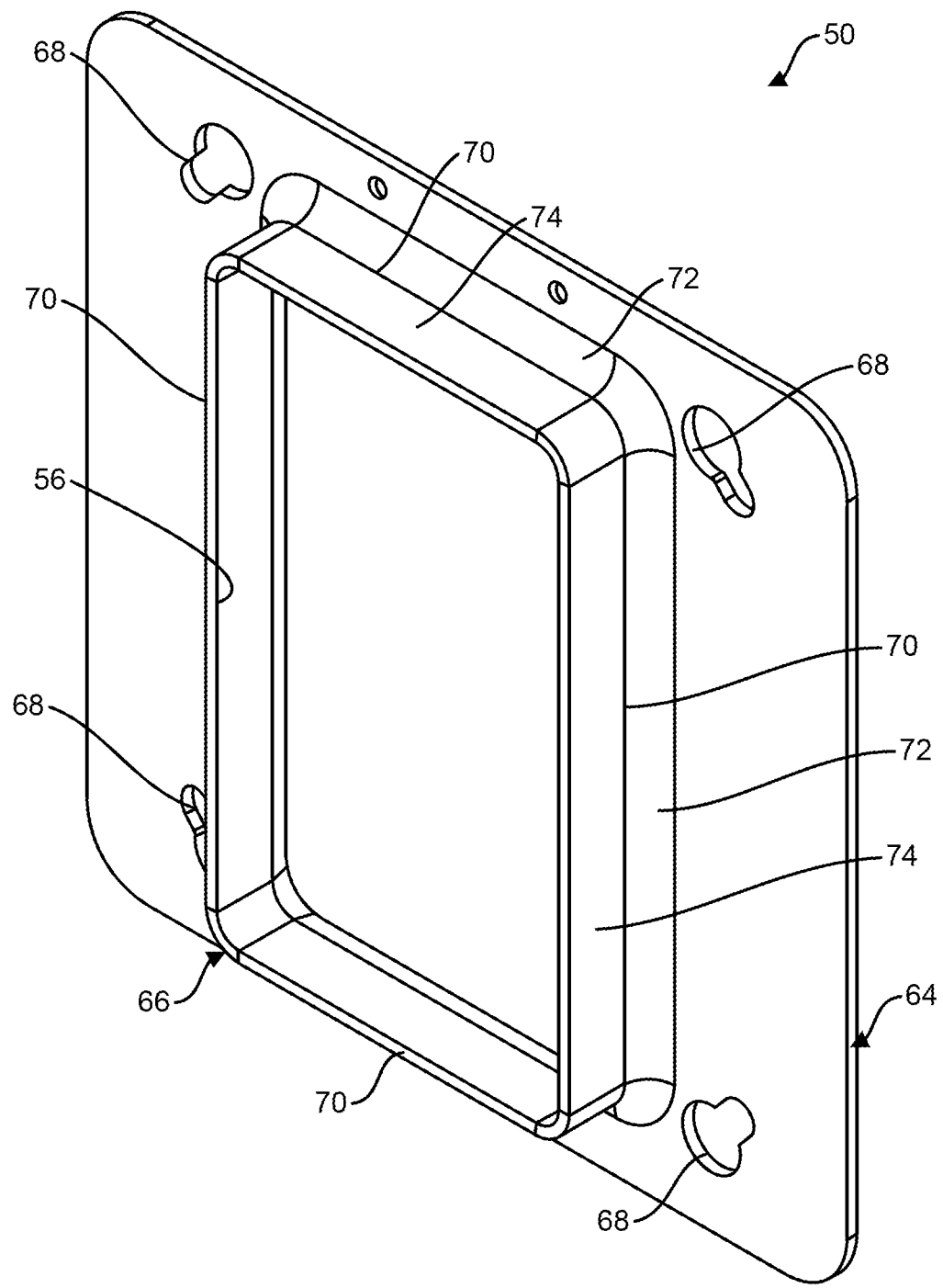
FIG. 7 is a perspective view of a box cover plate of the ring assembly.
Figure 8:
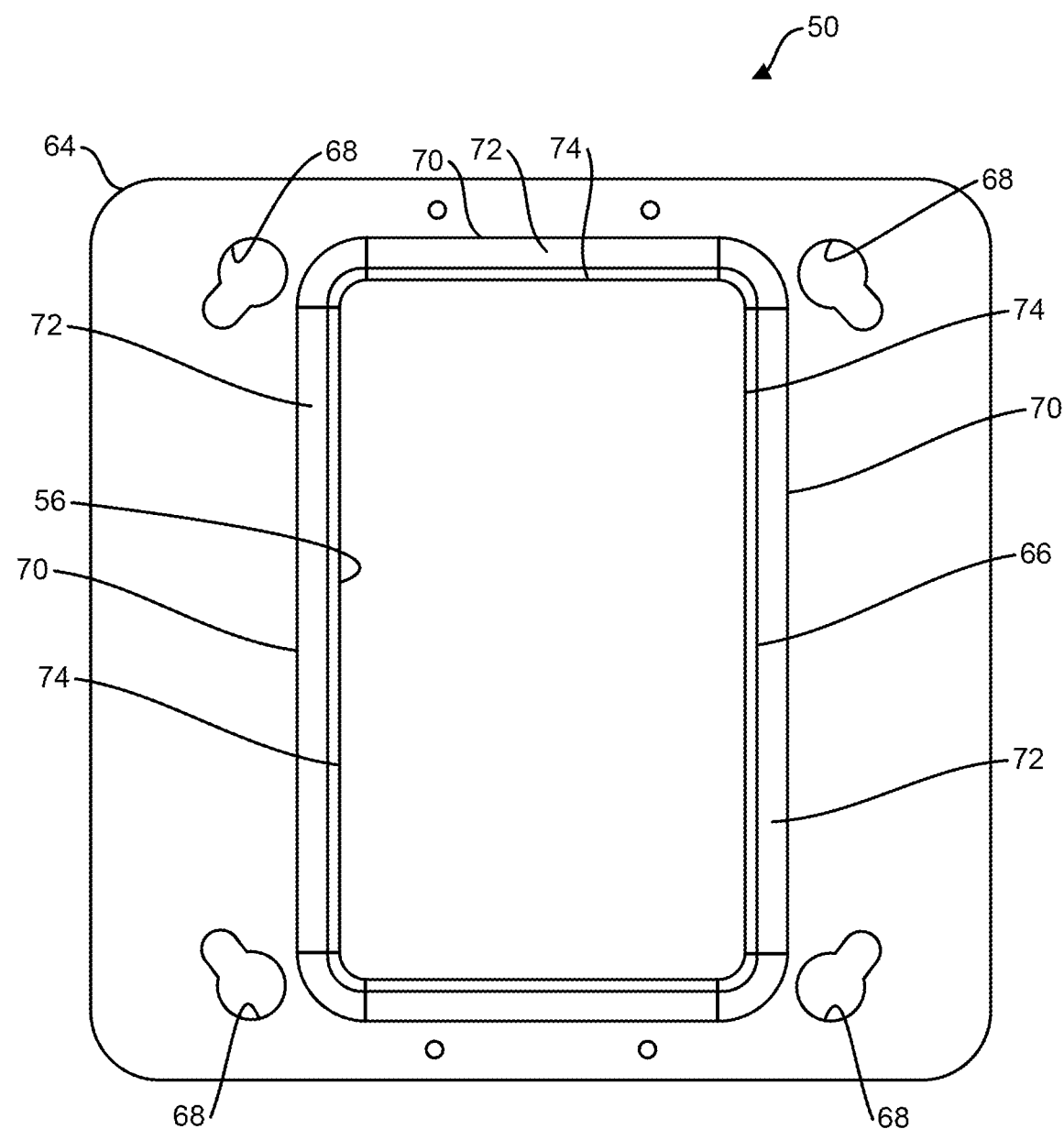
FIG. 8 is a front view of the box cover plate.
Figure 9:
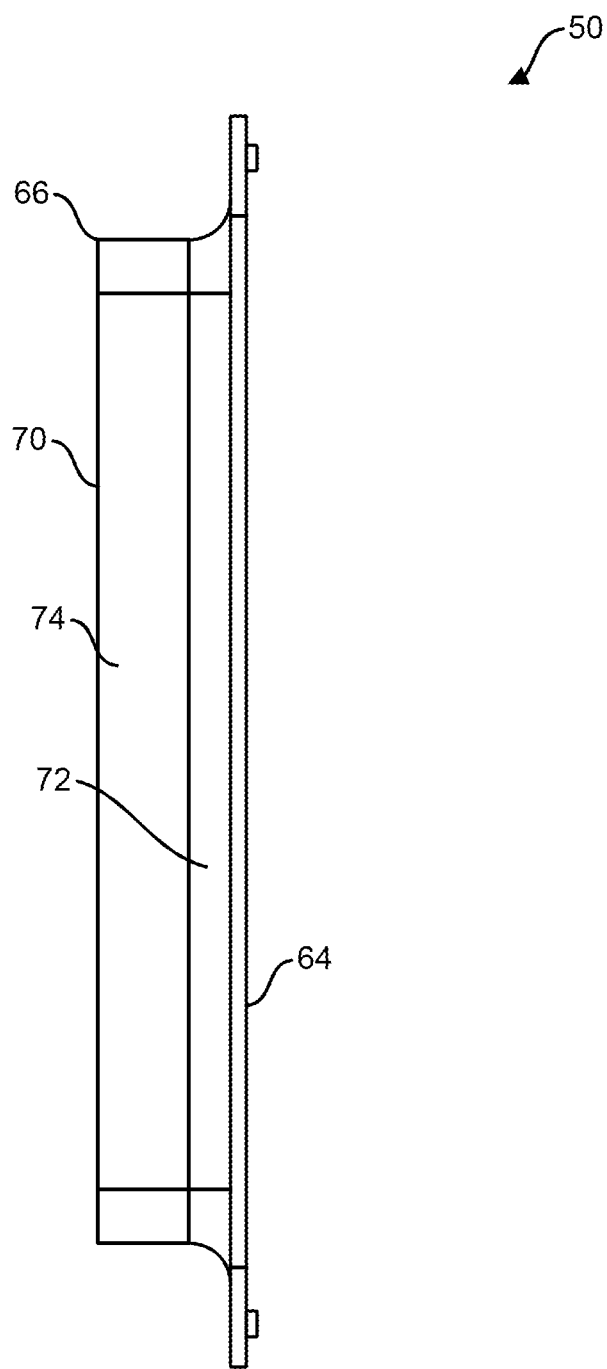
FIG. 9 is a side view of the box cover plate.

Referring to FIGS. 7-9, the box cover plate 50 includes a flat generally planar rigid plate 64 of suitable material (e.g., metal) and a raised portion 66 projecting laterally from the rigid plate and defining the central opening 56. In the illustrated embodiment, the raised portion 66 is formed integrally with the planar rigid plate 64. However, the raised portion 66 could be separate from the planar rigid plate 64 and suitably attached thereto. The planar rigid plate 64 may have conventional fastener openings 68 around its periphery for receiving fasteners to fasten the box cover plate to the electrical box 36. The number, shape and configuration of these openings can vary. In the illustrated embodiment, the raised portion 66 is defined by a plurality of walls 70 projecting laterally from the planar rigid plate 64. Each wall 70 includes a first curved portion 72 that extends directly from the planar rigid plate 64 and a second planar portion 74 extending from the curved portion. In one embodiment, the curved portion 72 is concave. The curved portion 72 positions the planar portion 74 such that the planar portion extends generally orthogonally to the planar rigid plate 64. Additionally, each wall 70 is contiguous with an adjacent wall defining rounded corners between the walls. Thus, the curved portions 72 of the walls 70 define a continuous track extending around the central opening 56. The walls 70 could also define straight (e.g., right angle) corners without departing from the scope of the disclosure.

In the illustrated embodiment, the walls 70 are oriented such that the raised portion 66 has a generally rectangular shape. Thus, there are four walls 70 including a top wall, a bottom wall, and a pair of side walls extending between the top and bottom walls. However, the raised portion 66 could have other configurations without departing from the scope of the disclosure. For example, the central opening 56 in the box cover plate 50, as defined by the raised portion 66, may have a rectangular, round, or octagonal shape and size that generally matches the opening 38 at the front of the electrical box 36. It will be understood in this regard that the box cover plate 50 can be sized for one electrical device or multiple electrical devices (e.g., two, three, four or more) depending on the size and wiring configuration of the electrical box 36. As will be explained in greater detail below, the raised portion 66 provides a protruding surface that can be seen from behind the wall member to assist an installer in mounting the electrical device 32.

Figure 10:
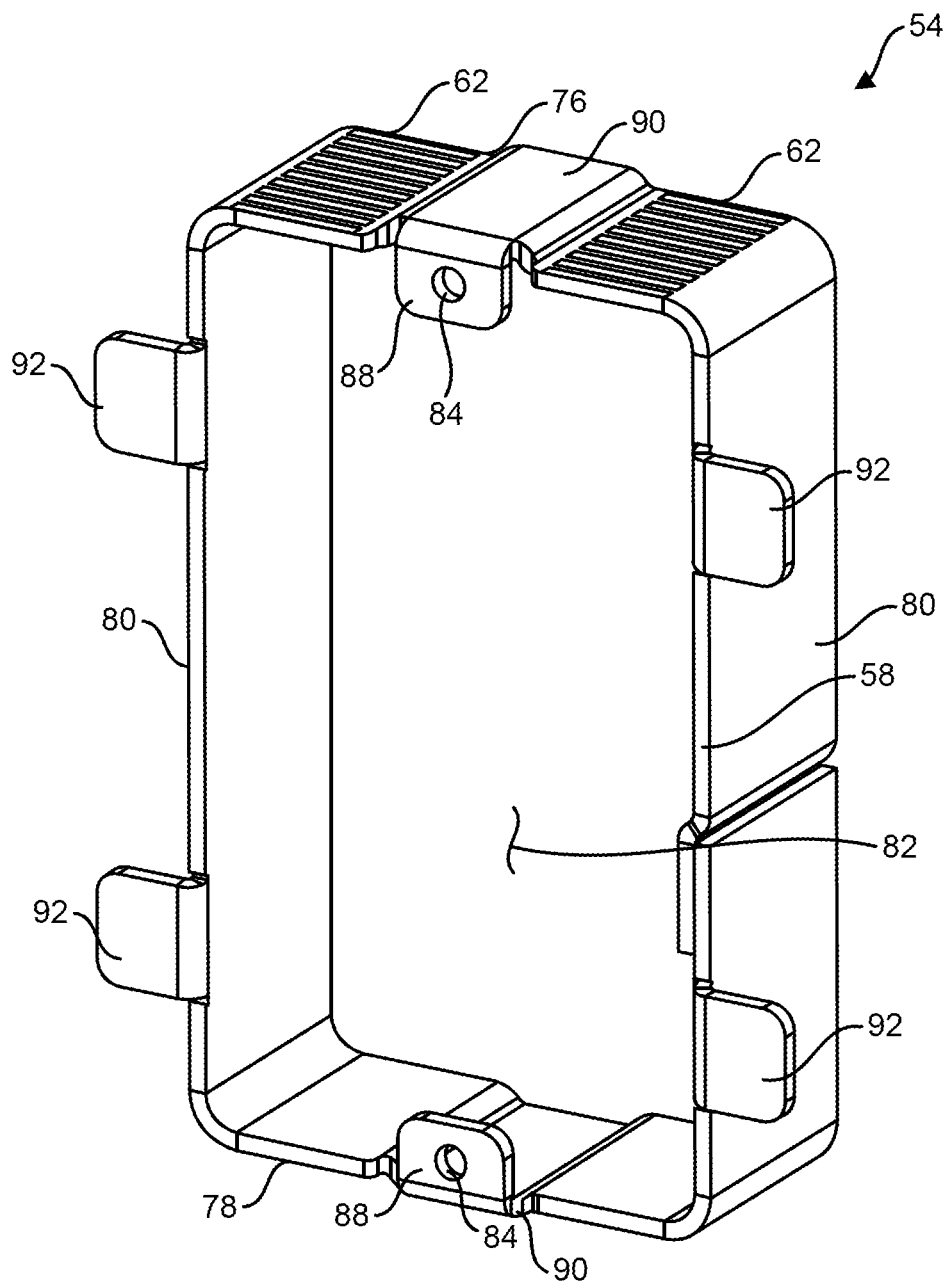
FIG. 10 is a perspective view of an extension ring of the ring assembly.
Figure 11:
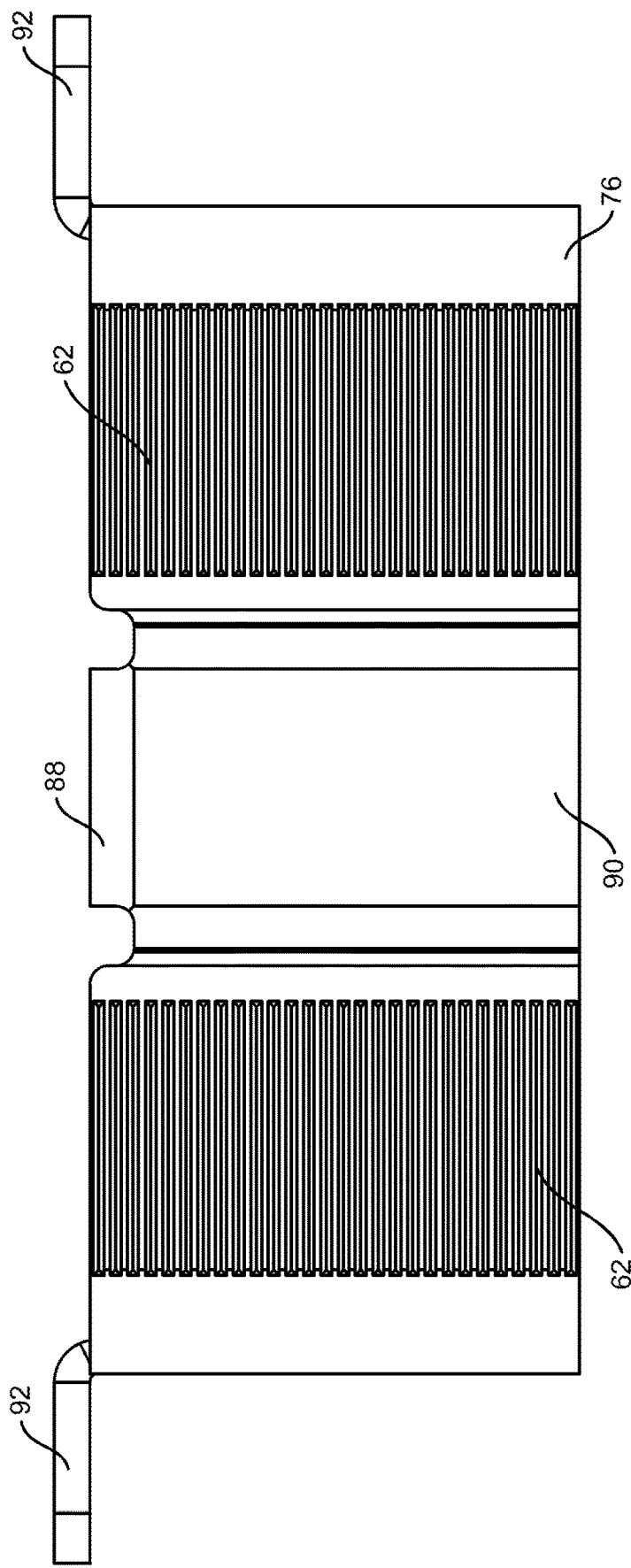
FIG. 11 is a top view of the extension ring.
Figure 12:
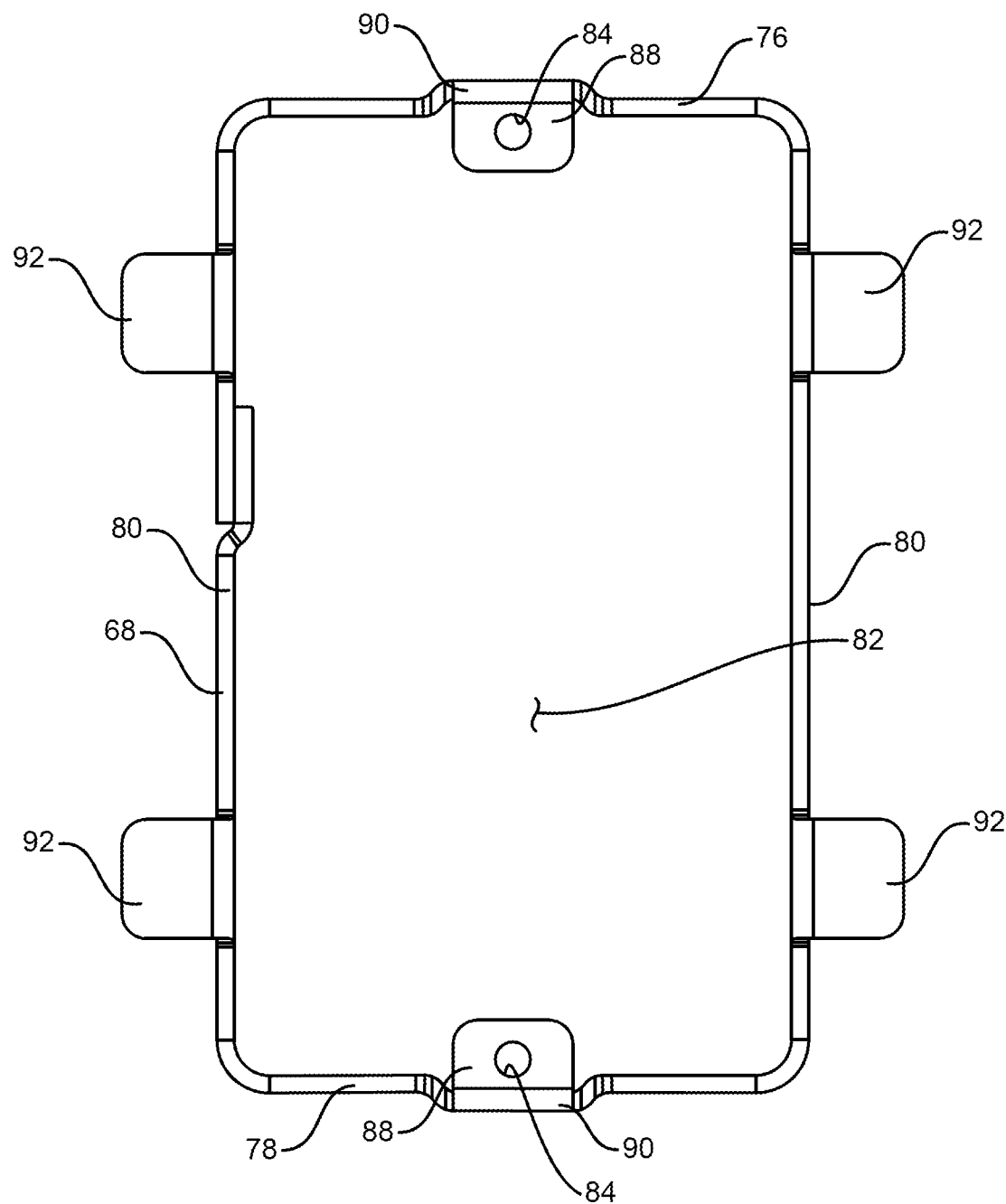
FIG. 12 is a front view of the extension ring.

Referring to FIGS. 10-12, the extension ring 54 is substantially rigid and of suitable material such as metal (e.g., galvanized steel). The ring 54 has top, bottom and side walls 76, 78, 80 extending rearward from the front 58 of the ring. Rounded corners connect the walls 76, 78, 80. The walls define a generally rectangular cavity 82 for receiving at least one electrical device 32. It will be understood in this regard that the extension ring 54 can be sized for one electrical device 32 or multiple electrical devices (e.g., two, three, four or more) depending on the size and wiring configuration of the junction box 36. At least one fastener opening 84 and desirably multiple fastener openings are provided in upper and lower flanges 88 of the ring 54 for receiving fasteners to fasten the electrical device(s) 32 to the ring. The flanges 88 extend from plateau portions 90 of the top and bottom walls 76, 78 of the ring 54. The plateau portion 90 of the top wall 76 is raised above the remainder of the top wall and inset from the front 58 of the ring 54. Similarly, the plateau portion 90 on the bottom wall 78 is dropped below the remainder of the bottom wall and inset from the front 58 of the ring 54. Having the plateau portions 90 inset allows for a front surface of the flanges 88 to be generally co-planar with one another and with the front 58 of the extension ring 54. Thus, the flanges 88 generally have a thickness the same as the distance in which the plateau portions 90 are inset from the front 58 of the ring 54.

Tabs 92 extend laterally outward from the side walls 80. Each tab 92 includes a bent portion extending directly from the front 58 of the ring 54 and a planar portion extending from the bent portion. Thus, an inner surface of the planar portion of each tab 92 is generally flush with the front 58 of the extension ring 54, and an outer surface of the planar portion of each tab 92 is offset from the front 58 of the ring 54 such that the outer surface of the tab is parallel to but not co-planar with the front 58 of the ring. In the illustrated embodiment, there are two tabs vertically spaced along each side wall 80. However, other numbers and arrangements of tabs 92 can be used without departing from the scope of the disclosure. As will be explained in greater detail below, the tabs 92 broadly define abutment structure for engaging the outer surface of the wall member to properly locate the electrical device 32 in the ring assembly 30.

The ring 54 comprises a hollow rectangular member formed as a single unitary structure. In the illustrated embodiment, the ring 54 includes a strip of material bent into a rectangular shape. The central axis CA (FIG. 3) of the ring 54 is generally coincident with the central axis of the box cover plate 50, and the ring is shaped and sized for a close-clearance sliding fit inside the central opening 56 of the box cover plate to permit forward and rearward movement of the extension ring relative to the cover plate. Each of the top and bottom walls 76, 78 of the extension ring 54 has a series of closely-spaced parallel horizontal grooves 62 arranged in two rows extending in an axial direction with respect to the ring. These grooves 62 cooperate with the spring clips 60 in a manner described below.

Figure 13:
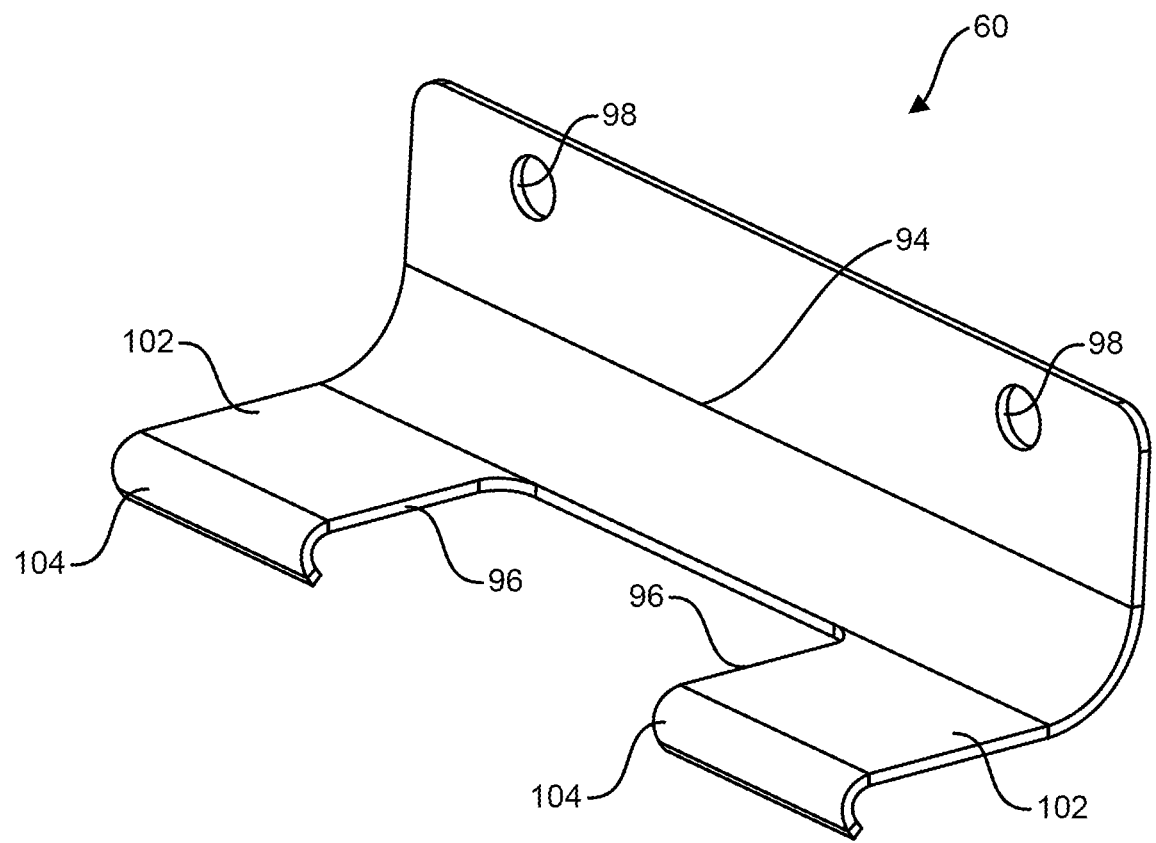
FIG. 13 is a front perspective view of a spring clip of the ring assembly.
Figure 14:
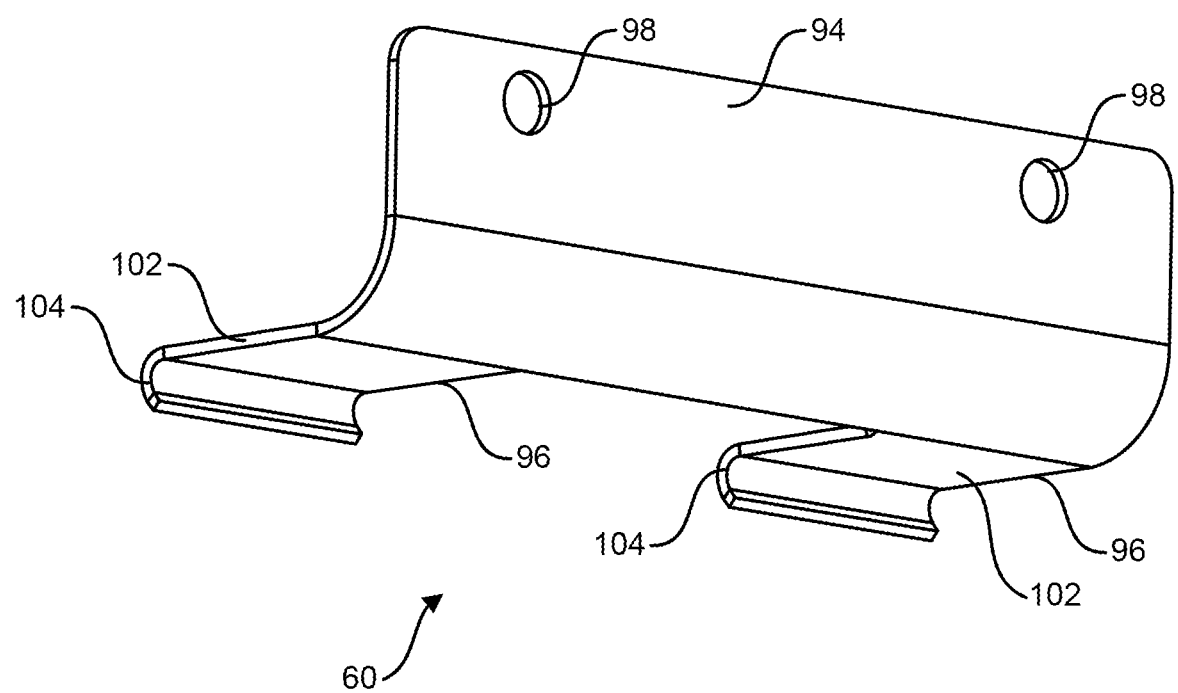
FIG. 14 is a rear perspective view of the spring clip.
Figure 15:
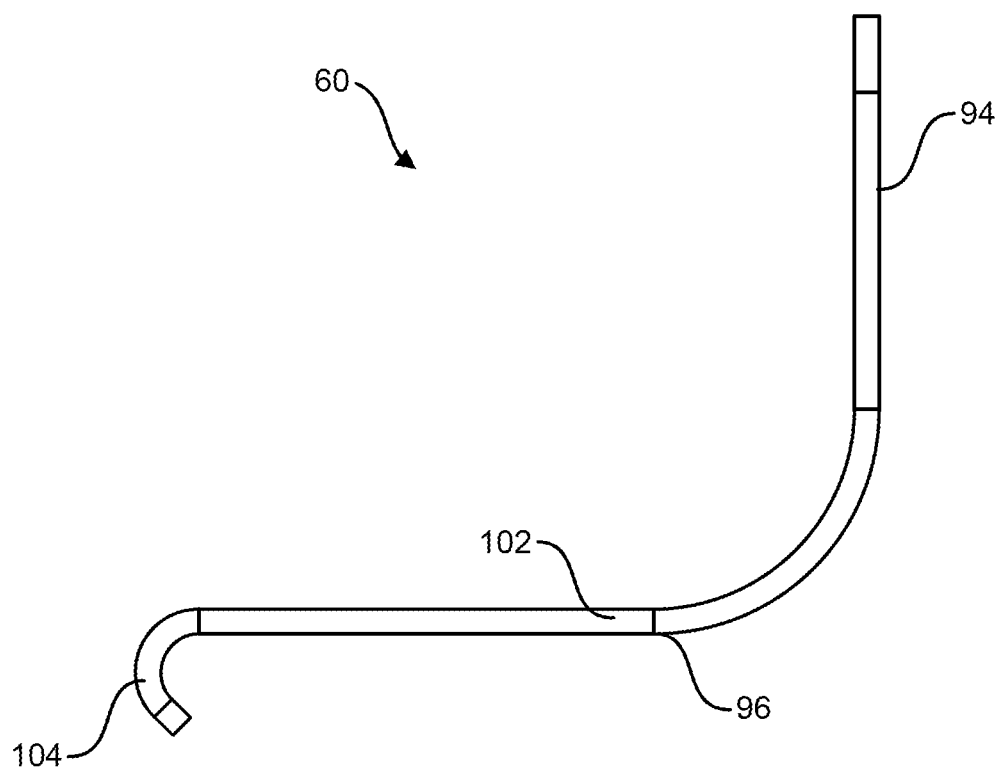
FIG. 15 is a side view of the spring clip.
Figure 16:
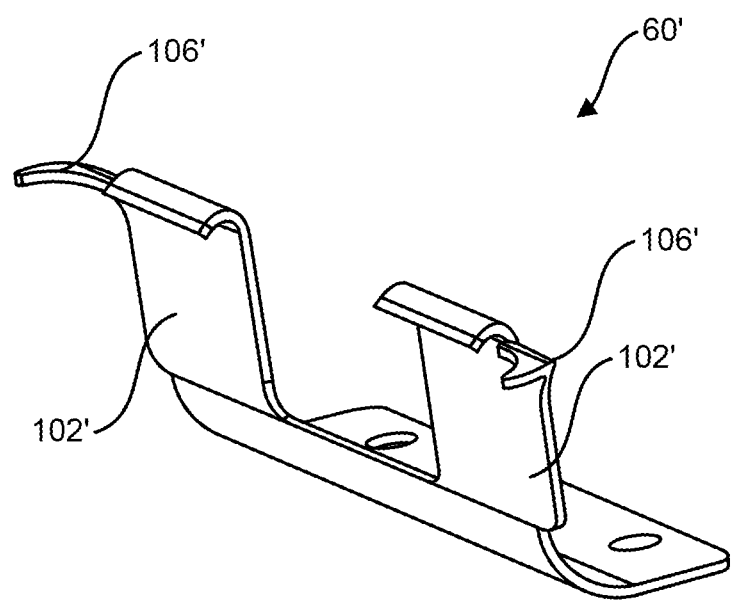
FIG. 16 is a bottom perspective of another embodiment of a spring clip showing a guide portion.

Referring to FIGS. 2, 6, and 13-15, the spring clips 60 are mounted at the top and bottom of the box cover plate 50. In the illustrated embodiment, one spring clip 60 is mounted at the top and bottom of the box cover plate 50. However, other numbers of spring clips 60 can be used without departing from the scope of the disclosure. As illustrated in FIGS. 13-15, each spring clip 60 comprises a clip body 94 attached to a rear surface of the planar rigid plate 64 of the box cover plate 50 and spring fingers 96 extending from the clip body. The clip body 94 defines fastener holes 98 configured to mate with fastener holes 100 (FIG. 6) in the planar rigid plate 64 to attach the spring clip 60 to the box cover plate 50. Each spring finger 96 includes an extension portion 102 extending from the clip body 94, and a clip portion 104 extending from the extension portion and configured to engage the grooves 62 on the extension ring 54. In one embodiment, a spring clip 60' (FIG. 16) includes a guide portion 106' that extends from an extension portion 102' and is configured for guiding movement of the extension ring 54 relative to the box cover plate 50. The extension portions 102 position the clip portions 104 for engagement with the grooves 62. The clip portions 104 curve out of plane from the extension portions 102 to a free end that engages with one of the top and bottom walls 90, 92 of the extension ring 54. The spring clips 60 are of a suitable material. By way of example but not limitation, the clips 60 can be of a material (e.g., heat treated spring steel) harder than the material of the extension ring 54 (e.g., galvanized steel) so that the spring finger 96 bites into the softer material of the extension ring to resist movement of the extension ring in a forward direction with respect to the ring. Further, the grooves 62 in the top and bottom walls 76, 78 of the extension ring 54 are positioned for receiving the free ends of the spring fingers 96 to increase such resistance. Thus, the spring clips 60 are configured such that the clips are operable to allow the extension ring 54 to be pushed only in a rearward direction and resist movement in a forward direction relative to the box cover plate 50. In the illustrated embodiment, two rows of grooves 62 are disposed on opposite sides of the plateau portions 90 of the top and bottom walls 76, 78. Thus, the spring fingers 96 of each spring clip 60 are mirrored about a central vertical axis of the extension ring 54 to provide greater stability of the extension ring in the box cover plate 50 and to prevent binding during axial movement of the extension ring relative to the cover plate.

It is also envisioned that other spring clip configurations are possible. By way of example but not limitation, each spring clip 60 could be separated into two individual spring clips that are separately attachable to the box cover plate 50. In the illustrated embodiment, there are two spring fingers 96 on each spring clip 60. However, one or more than two spring fingers can be utilized without departing from the scope of the disclosure.

Figure 1:
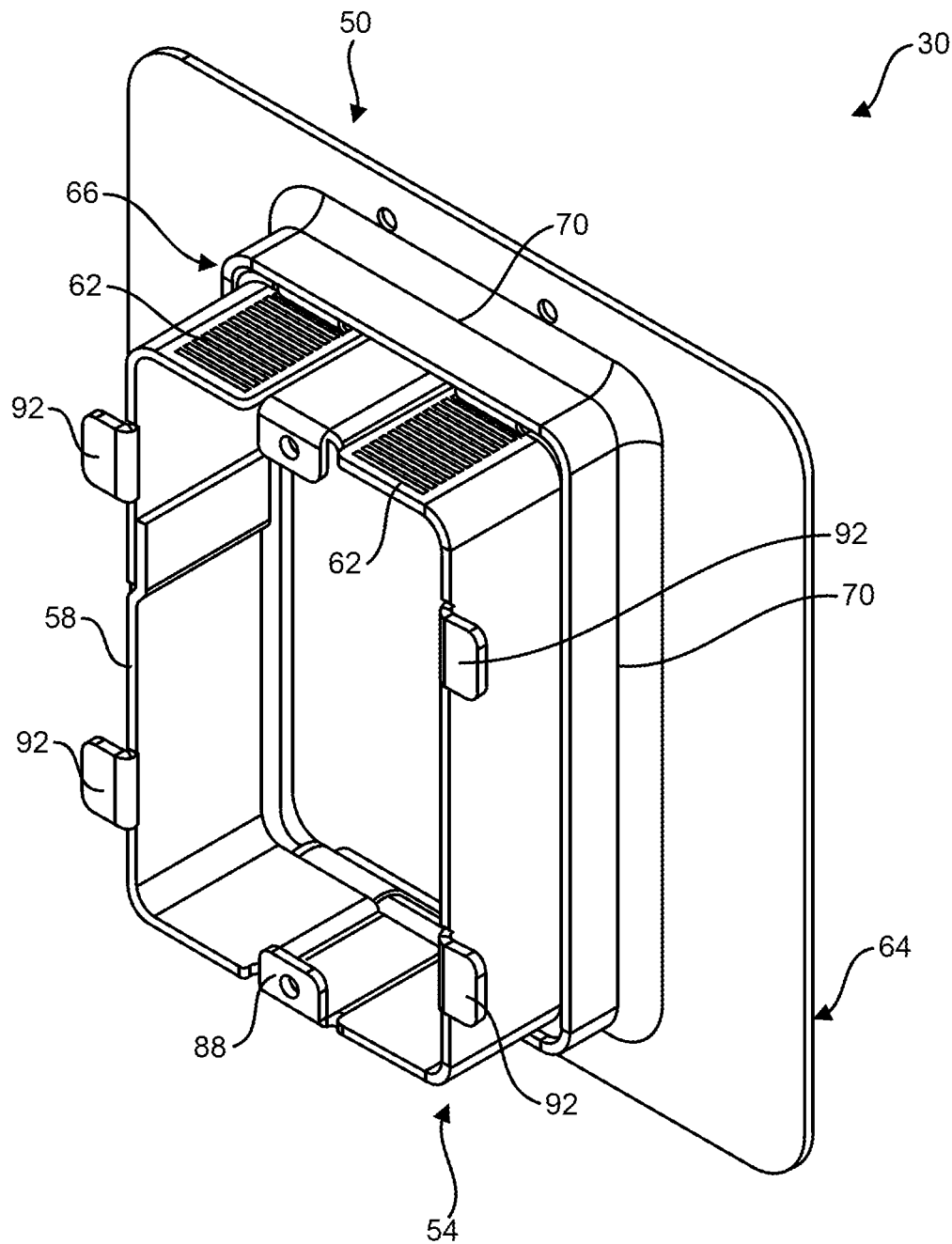
FIG. 1 is a front perspective view of an adjustable-depth ring assembly.
Figure 2:
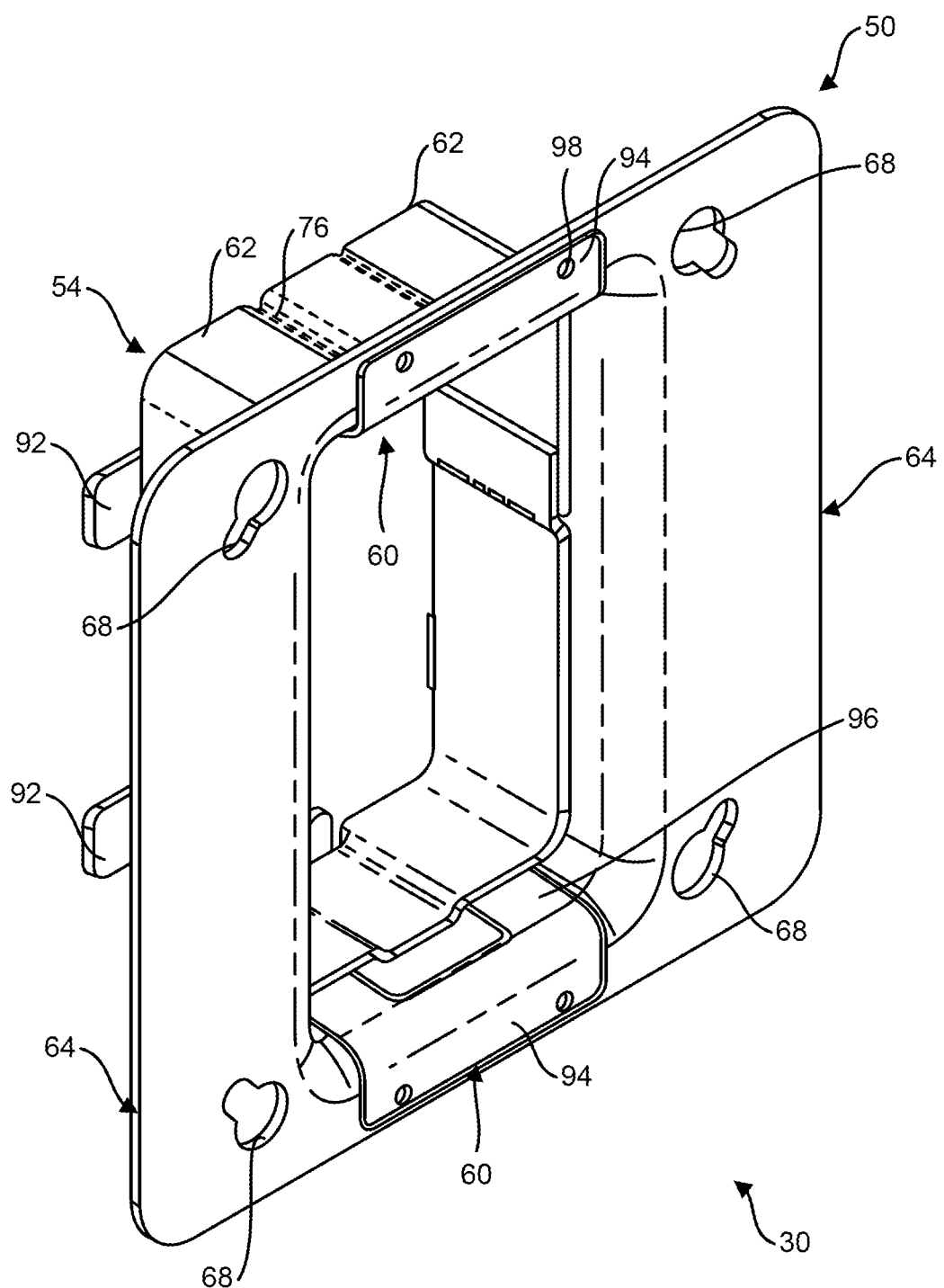
FIG. 2 is a rear perspective view of the ring assembly.
Figure 3:
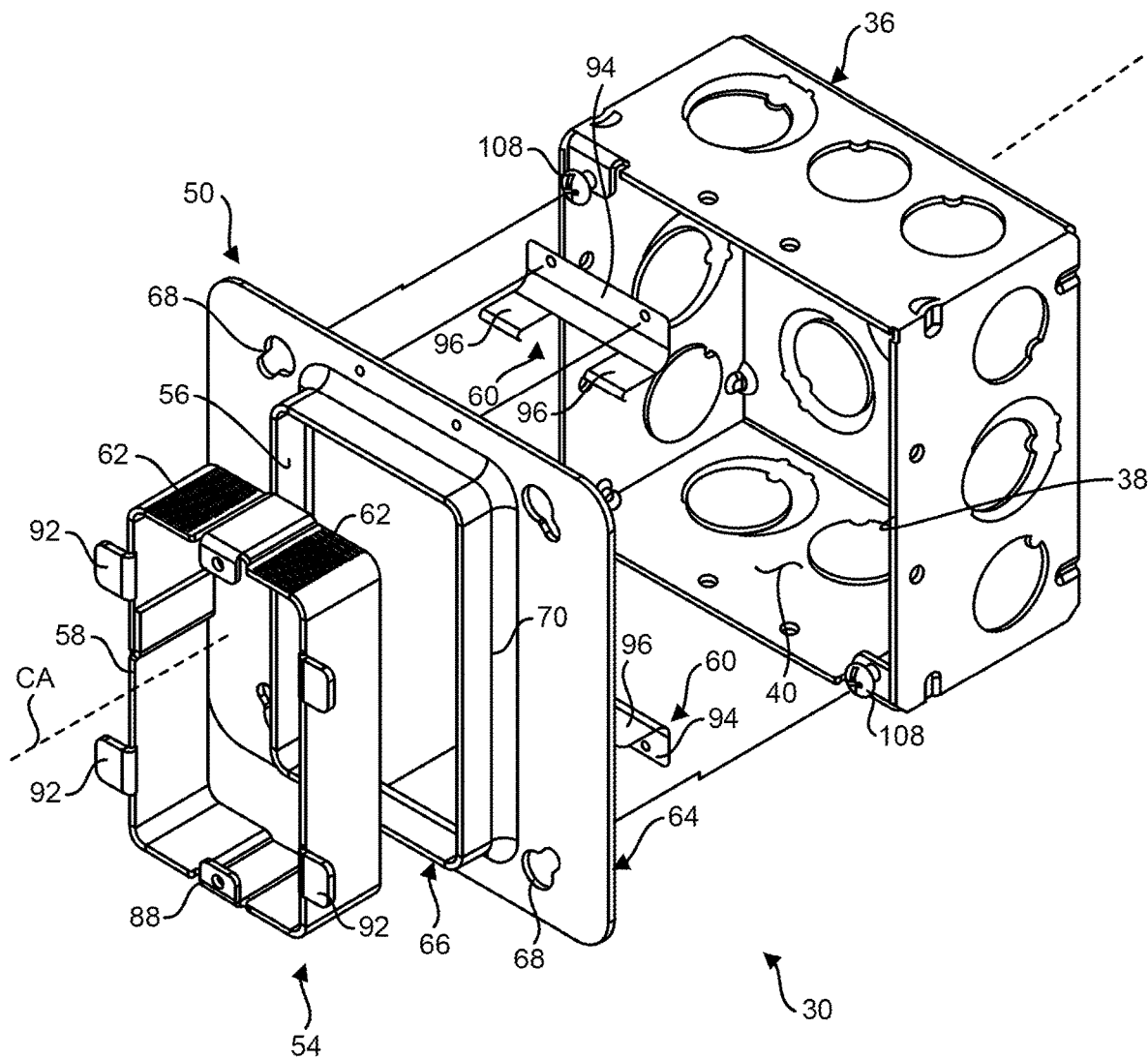
FIG. 3 is an exploded view of the ring assembly including an electrical box.
Figure 4:
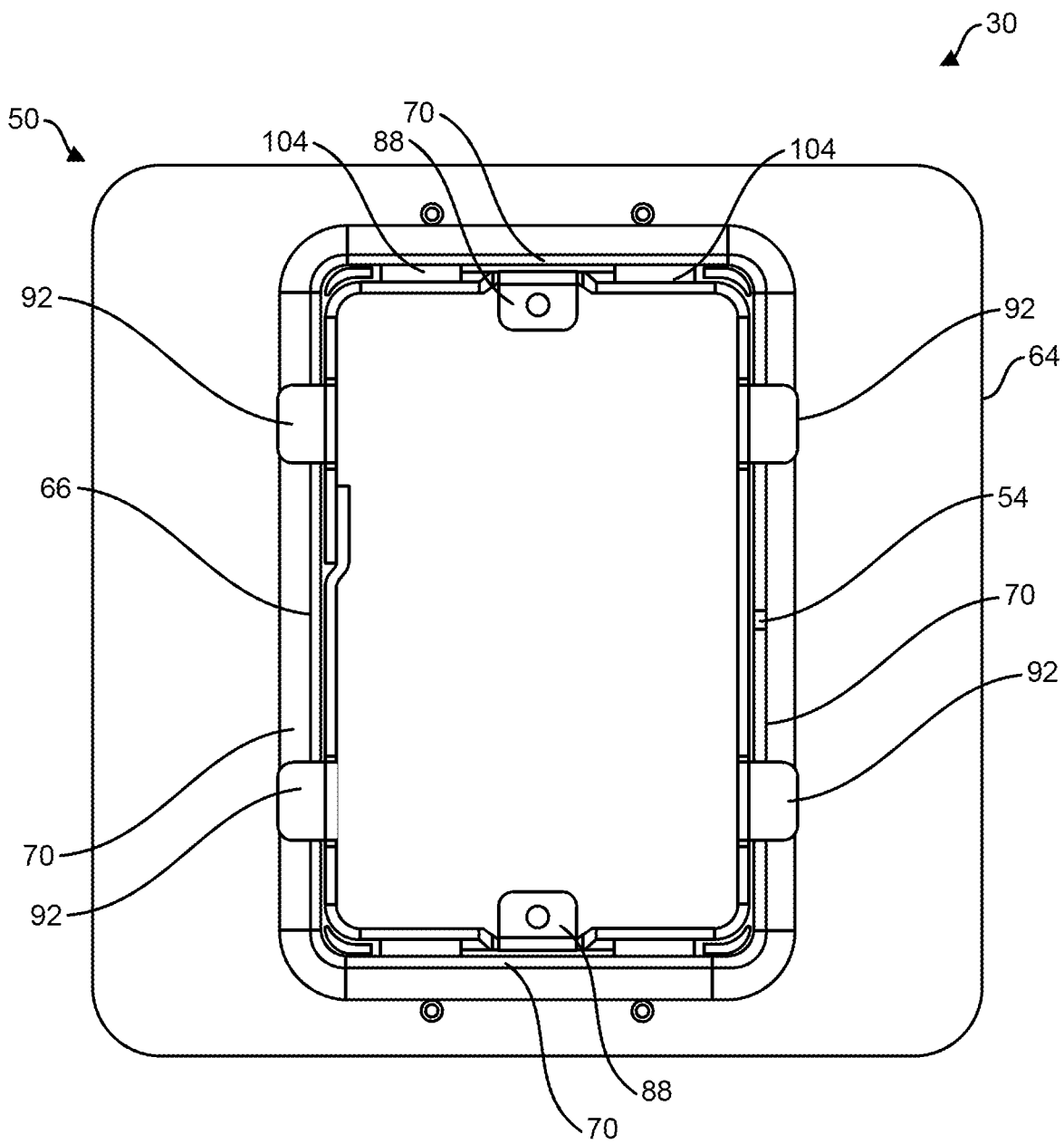
FIG. 4 is a front view of the ring assembly.
Figure 5:
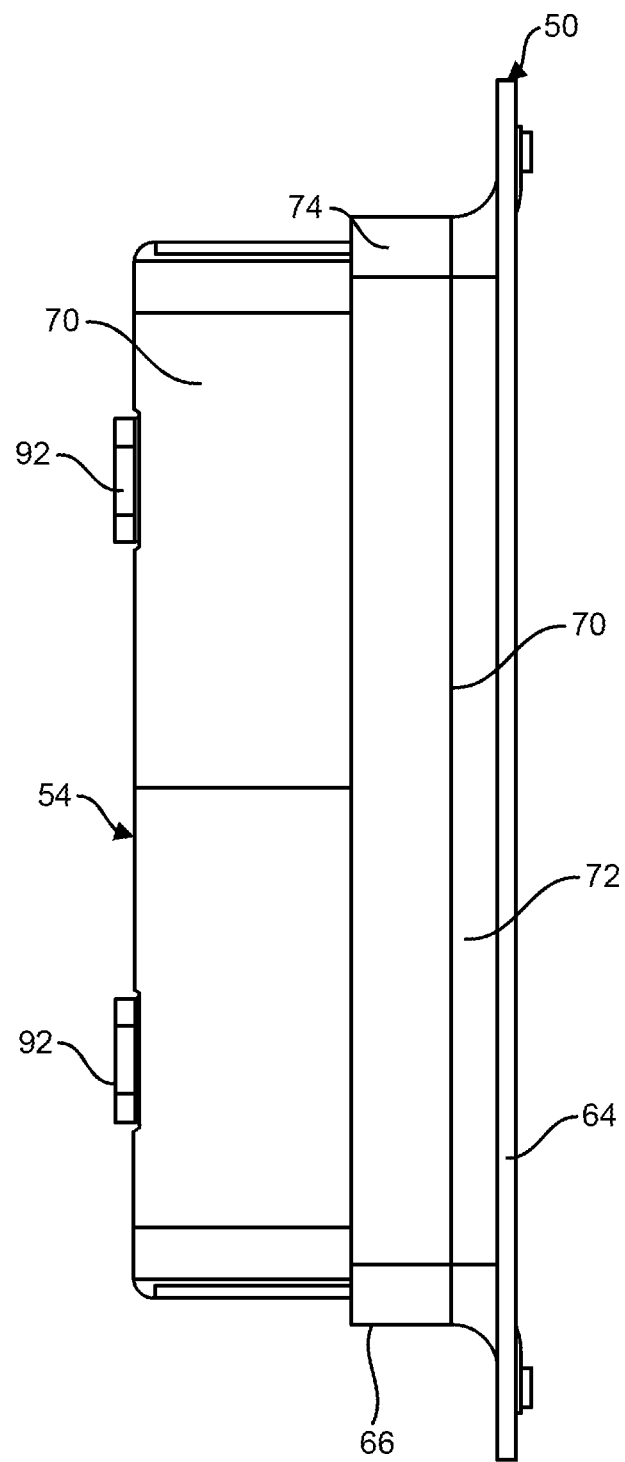
FIG. 5 is a side view of the ring assembly.
Figure 6:
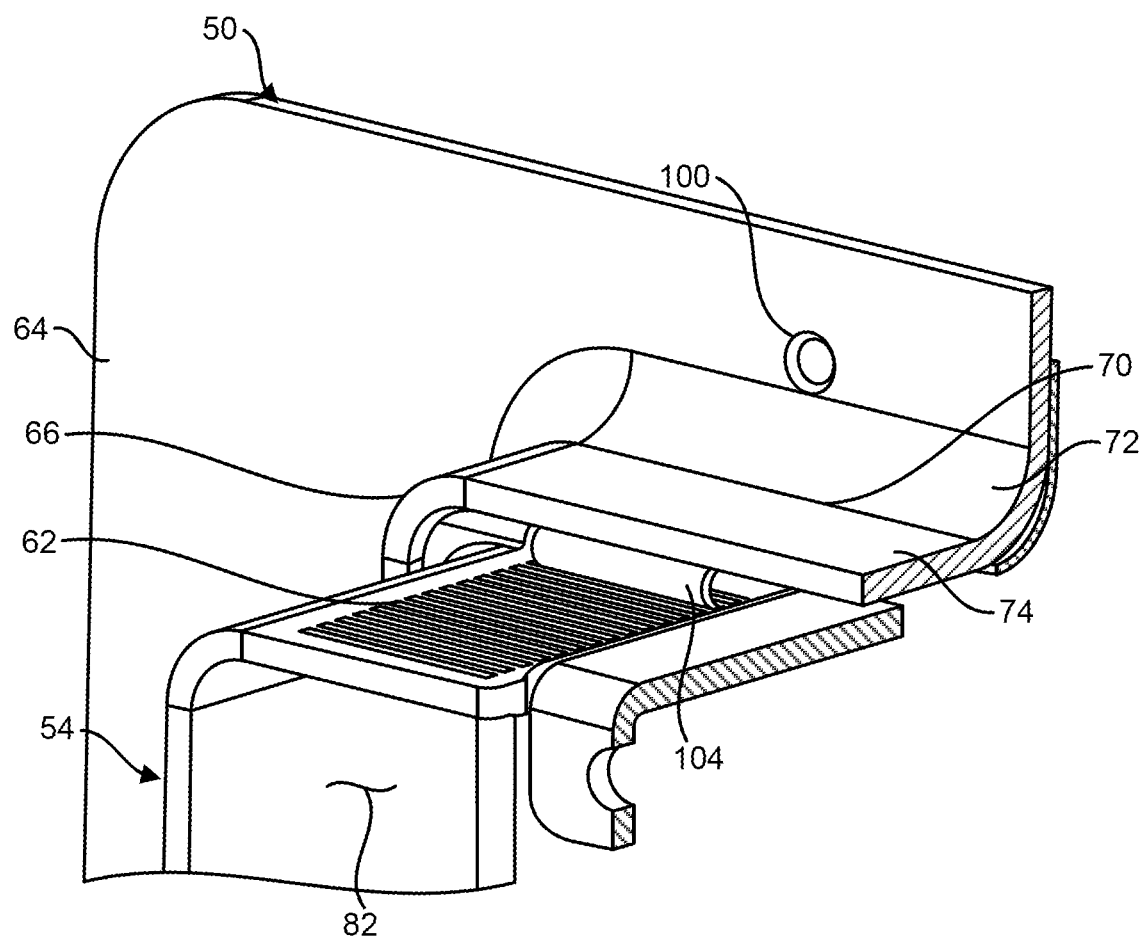
FIG. 6 is a fragmentary perspective of the ring assembly showing portions broken away.

Referring to FIGS. 1, 3, and 6, a method of installing the assembly 30 in an electrical box 36 is described below. To begin the process, the electrical box 36 is mounted in position on a frame (not shown), typically a wood or metal stud, using a box-mounting bracket (not shown) or other device. The box 36 is wired, and the box cover plate 50 is secured to the front of the electrical box using suitable fasteners 108 (FIG. 3) extending through fastener openings 68 in the plate into fastener openings in the box, such that the central opening 56 in the plate is in registration with the opening 50 at the front of the box.

The wall member is installed in front of the box cover plate 50. Because the box cover plate includes the raised portion 66, the box cover plate extends forward of the frame and thus presses against the back of the wall member. This results in a bulging area that can be seen at the front or exterior surface of the wall member. Thus, the installer has a visual reference of where the box cover plate 50 is located behind the wall member. By locating their cutting tool at the periphery of the bulging area and cutting through the wall member, the cutting tool will engage the rounded track defined by the walls 70 of the raised portion 66 providing a guide for cutting around the opening 56 in the box plate cover 50. Cutting the wall member around the opening 56 in the box cover plate 50 will produce an opening in the wall member to provide access to the opening in the box cover plate.

One or more electrical devices 32 are mounted side-by-side in the cavity 82 defined by the extension ring 54 and secured to the ring using suitable threaded fasteners extending through fastener openings 110 (FIG. 17) in tabs 112 of the electrical device(s) and through aligned fastener openings 84 in the flanges 88 of the extension ring. The wiring of the electrical device(s) 32 is connected to the wiring in the junction box 36. The extension ring 54 is then engaged with the box plate cover 50 such that a back of the ring is received in the opening 56 in the box cover plate. The clip portions 104 of the spring clips 60 will engage the grooves 62 on the extension ring 54 and the guide portions 106' of the clips will receive the rounded corners of the ring. The extension ring 54 can then be pushed reward into to opening 56 in the box cover plate 50. The engagement of the guide portions 106' of the spring clips 60 with the corners of the extension ring 54 will guide the movement of the ring, and the ratchet engagement of the spring fingers 96 of the spring clips with the grooves 62 in the ring will prevent the ring from being moved in the forward direction. Continued movement of the extension ring 54 into the opening 56 in the box cover plate 50 will cause the tabs 92 to engage the exterior surface of the wall member. Desirably, the spring fingers 96 make a "clicking" noise as they move over the grooves 62 in the extension ring 54. A final push or "click" tightens the extension ring 54 against the wall member, thus assuring the installer that the front 58 of the extension ring is generally flush (i.e., co-planar) with the front surface of the wall member and that the electrical devices 32 are properly positioned substantially flush with the outer surface of the wall member. As a final step, a finish plate (not shown) is attached to the electrical device(s) 32, using suitable fasteners, to cover the electrical device(s) and the opening in the wall member.

Unlike conventional methods, the above installation process is quick and easy, and the assembly 30 is easily adjustable to accommodate walls of virtually any thickness within a desired range (e.g., ⅝ in. to 1¼ in.). Also, there is no need to use adjustment screws, which makes the process more convenient and less time-consuming. Further, the installer is aided by a visual indication of where the box cover plate 50 is located behind the wall member so that an appropriately positioned and sized cut can be made into the wall member for installing the electrical device(s) 32.

Referring to FIGS. 17-24, another embodiment of an adjustable-depth ring assembly is generally designated at 230. The adjustable-depth ring assembly of this embodiment is substantially identical to the assembly 30 of the previous embodiment. However, each wall 270 of the raised portion 266 of the box cover plate 250 include a lip 271 extending over the opening 256 of the box cover plate. The lips 271 on the top and bottom walls 270 include cutouts 273 for receiving the plateau portions 305 of the extension ring 254. Additionally, each spring clip 260 includes only one spring finger 296. Thus, the assembly 230 includes two spring clips 260 at the top of the assembly 230 and two spring clips at the bottom of the assembly. Also, the guide portions are removed from the spring clips 260. Rather, rounded corners connecting the lips 271 provide the guide structure for receiving the extension ring 254. A top and bottom wall 276, 278 of the extension ring 254 include angled surfaces 279, on opposite side of the plateau portions 290, that extend from the back of the ring to a horizontal surface on which the grooves 262 are located. The angle surfaces 279 provide a ramp surface for being contacted by the spring fingers 296 of the spring clips 260 to tension the spring clips so that they provide a sufficient force on the extension ring 254 to prevent forward movement of the ring once the spring clips engage the grooves 262.

Figure 25:
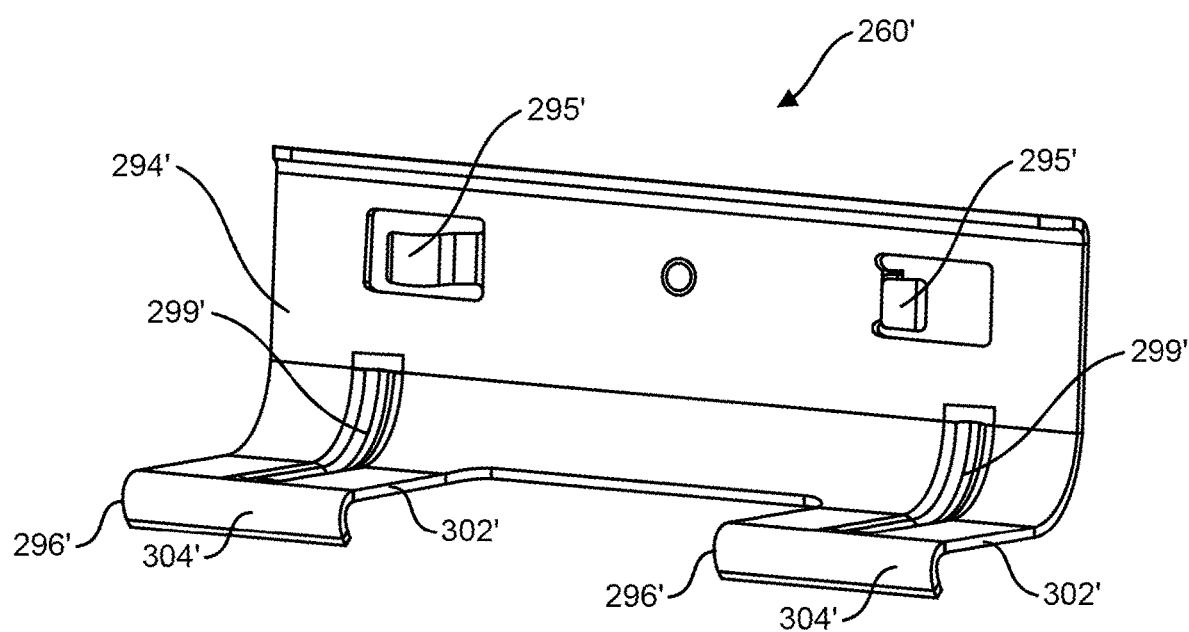
FIG. 25 is a front perspective of another spring clip of the ring assembly in FIG. 17.
Figure 26:
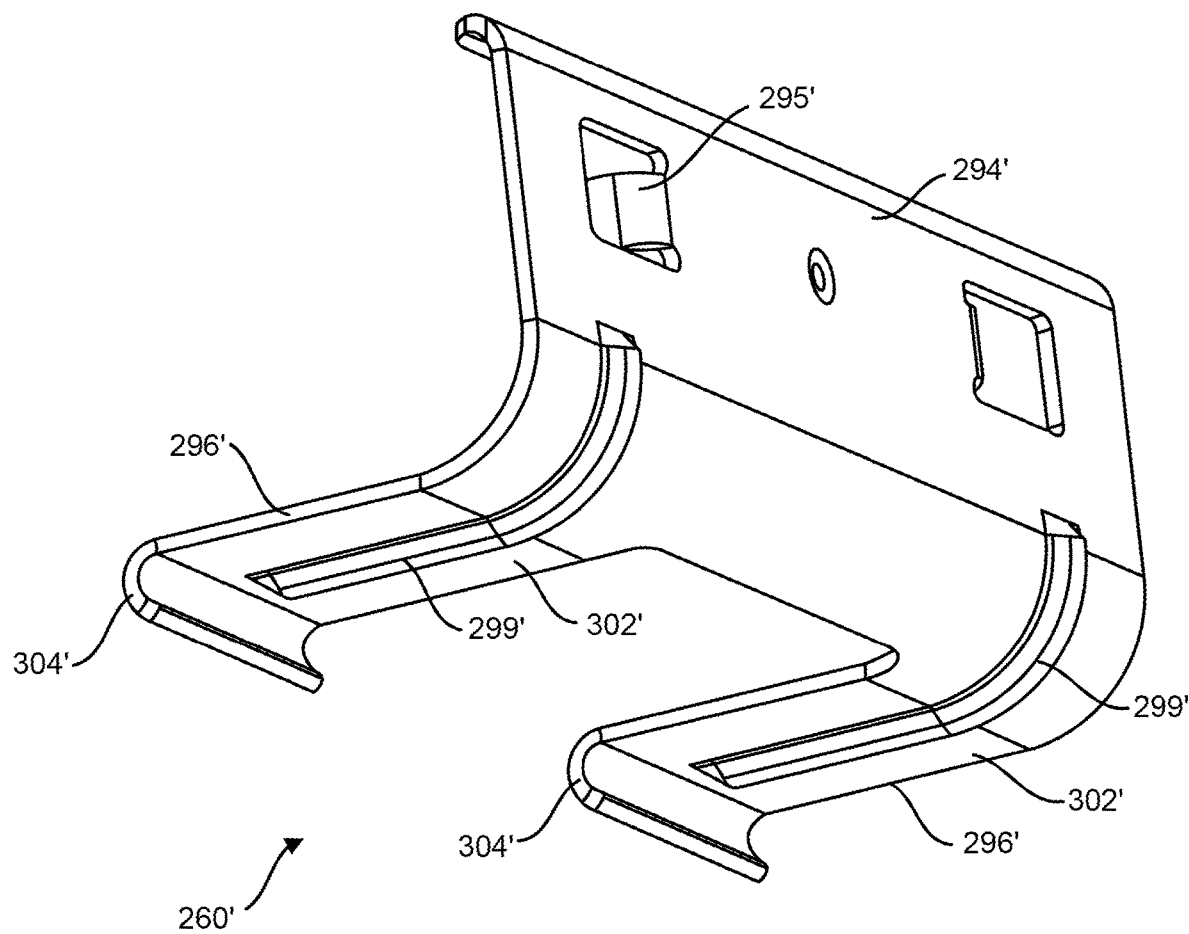
FIG. 26 is a rear perspective of the spring clip in FIG. 25.
Figure 27:
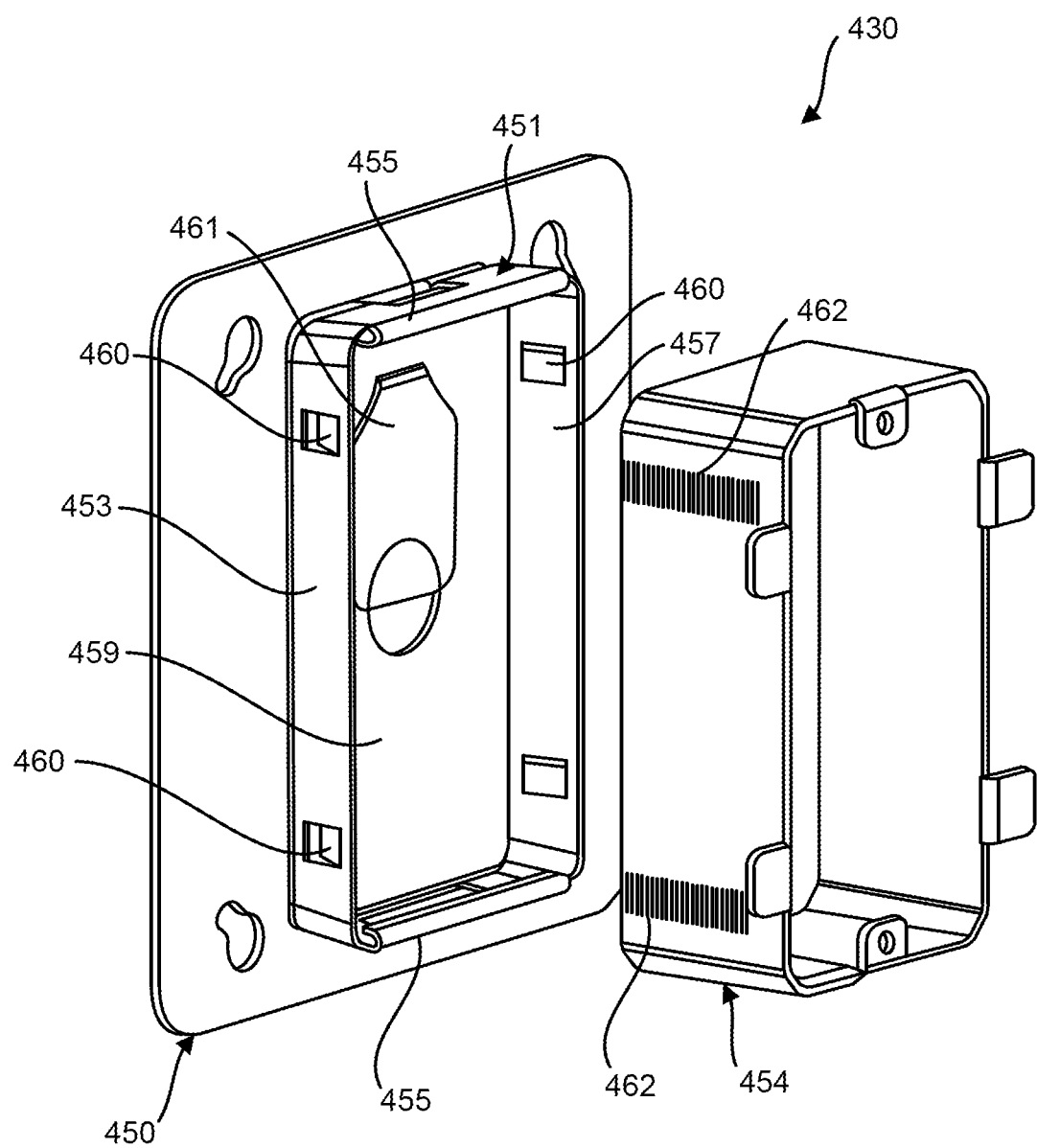
FIG. 27 is a partially exploded perspective view of another embodiment of an adjustable-depth ring assembly.
Figure 28:
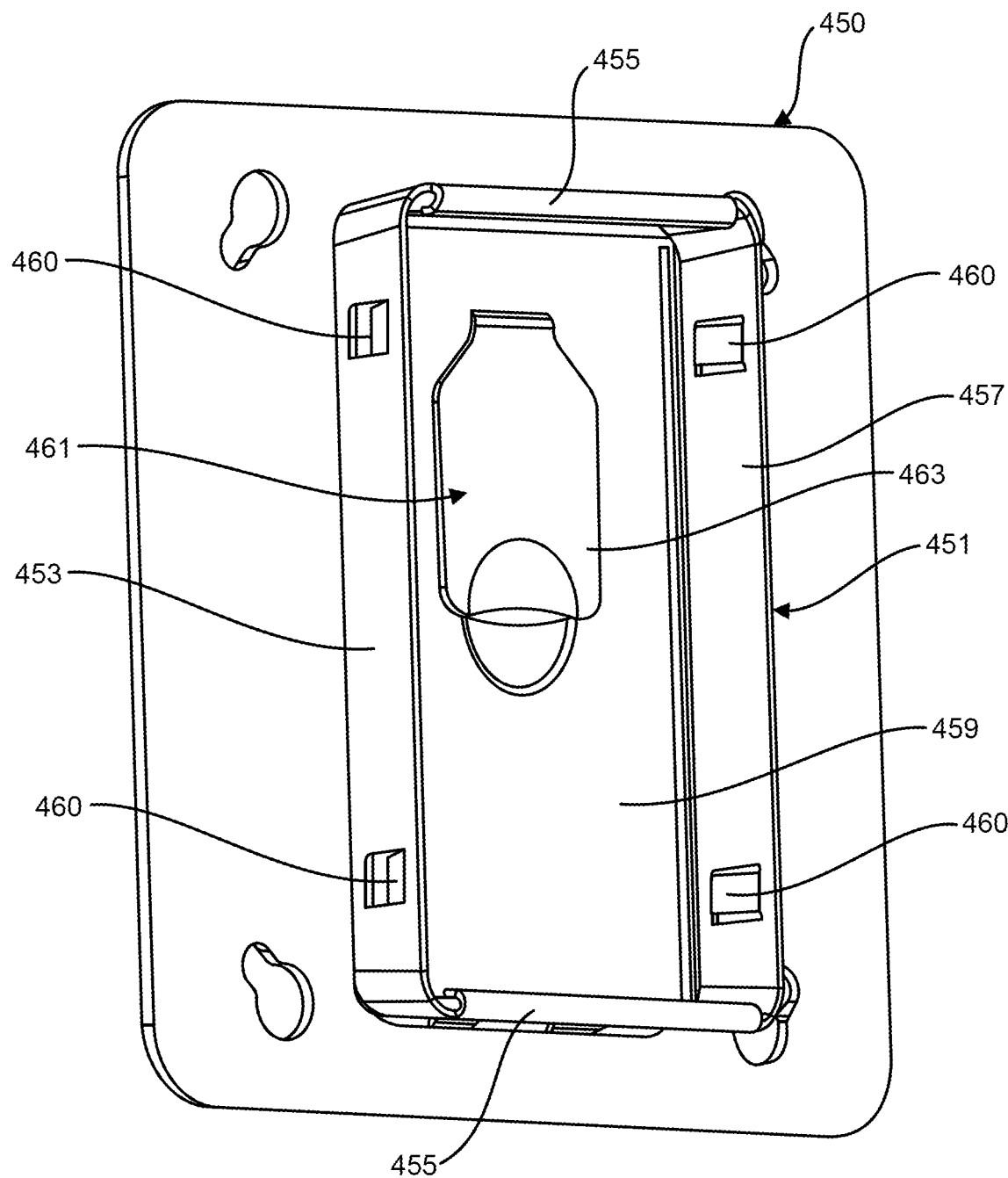
FIG. 28 is a front perspective of a box cover plate and cover of the assembly in FIG. 27.
Figure 29:
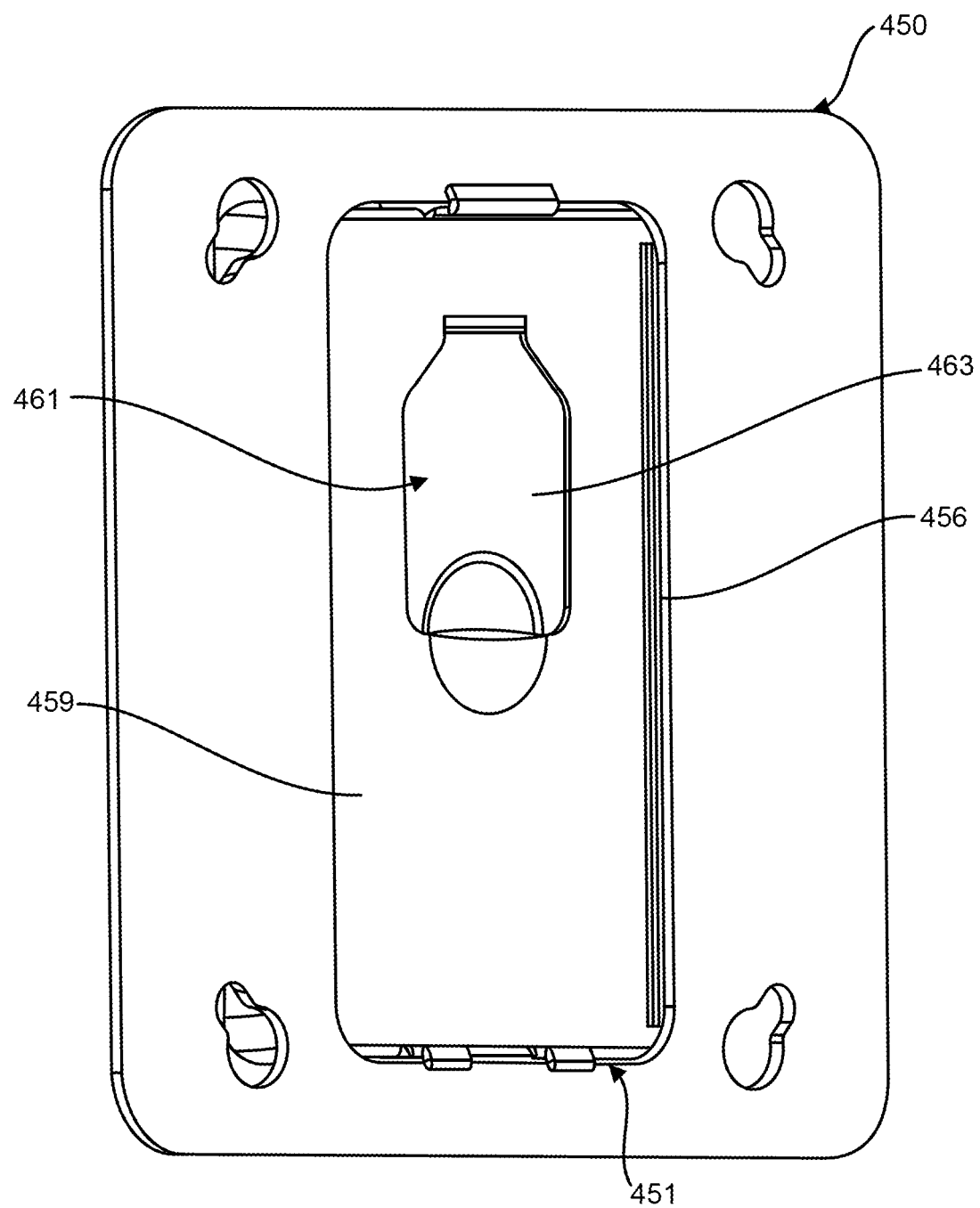
FIG. 29 is a rear perspective of the box cover plate and cover of the assembly in FIG. 27.

Referring to FIGS. 25 and 26, a spring clip of another embodiment is indicated at 260'. The spring clip 260' may be used in assembly 230. The spring clips 260' are mounted at the top and bottom of the box cover plate 250. In the illustrated embodiment, one spring clip 260 is mounted at the top and bottom of the box cover plate 250. However, other numbers of spring clips 260 can be used without departing from the scope of the disclosure. Each spring clip 260' comprises a clip body 294' attached to a rear surface of the planar rigid plate 264 of the box cover plate 250 and spring fingers 296' extending from the clip body. A pair of attachment arms 295' extend from the clip body 294' and are configured to be received in holes 297 in the box cover plate 250 to secure the spring clip 260' to the box cover plate. Each spring finger 296' includes an extension portion 302' extending from the clip body 294', and a clip portion 304' extending from the extension portion and configured to engage the grooves 262 on the extension ring 254. The extension portions 302' position the clip portions 304' for engagement with the grooves 262. A rib 299' is formed in each of the spring fingers 296' and provides both flexibility and rigidity to the spring finger.

Figure 30:
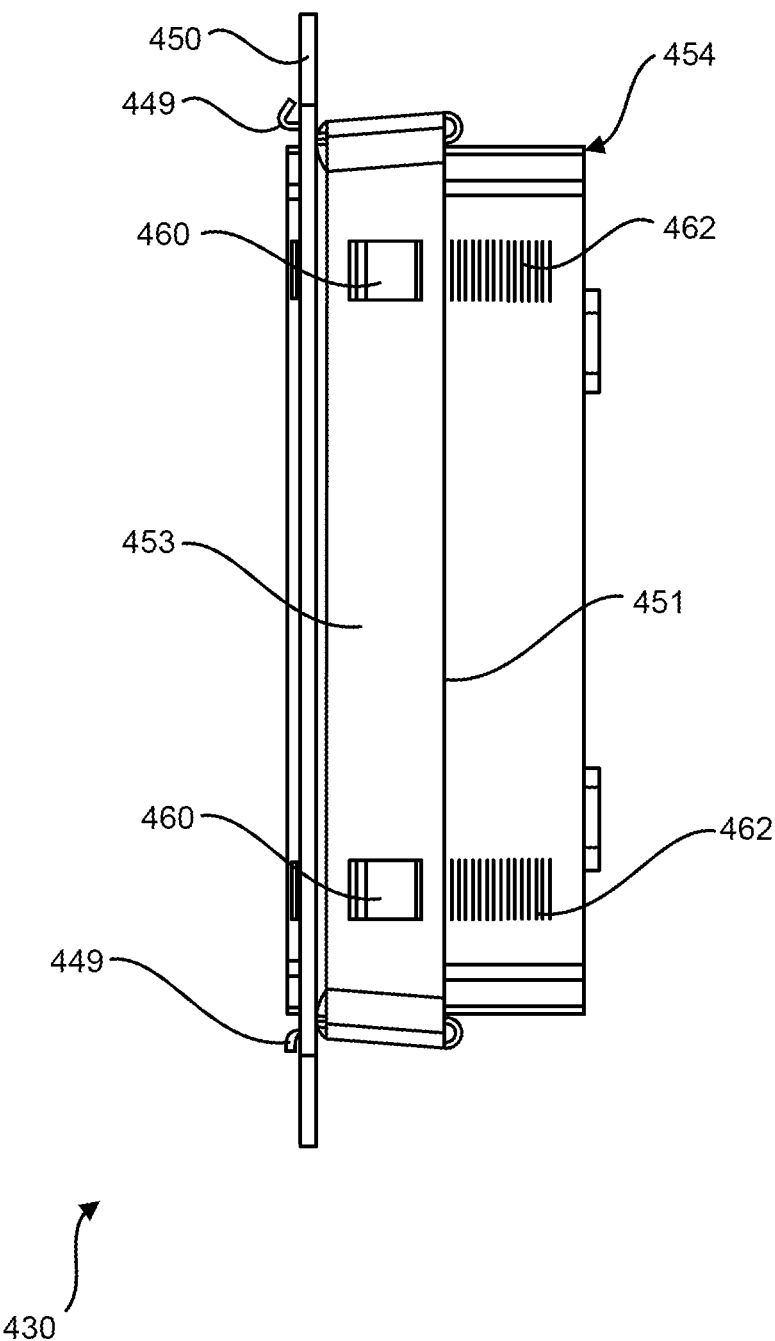
FIG. 30 is a side view of the assembly in FIG. 27 with a face place of the cover removed and an extension ring attached to the cover.
Figure 31:
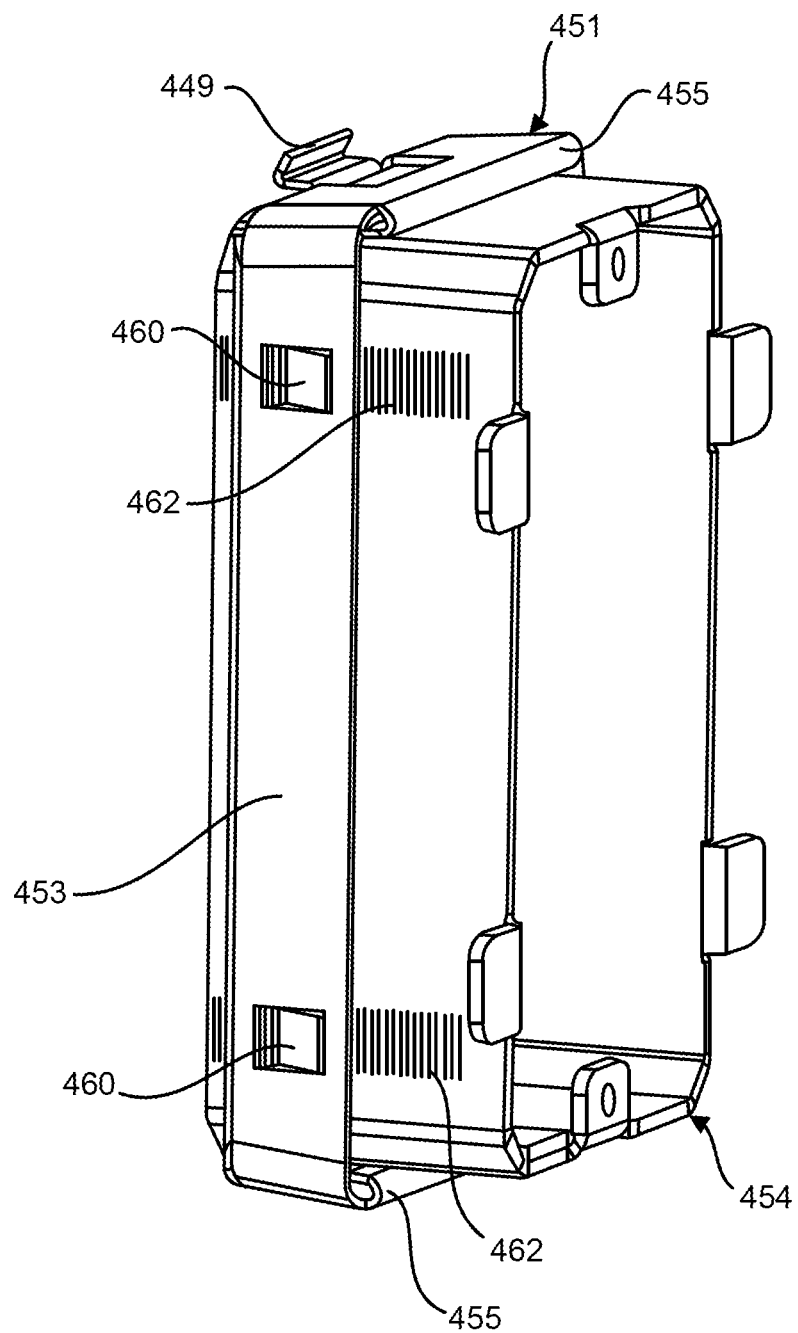
FIG. 31 is a perspective of the cover and extension ring of the assembly in FIG. 27.
Figure 32:
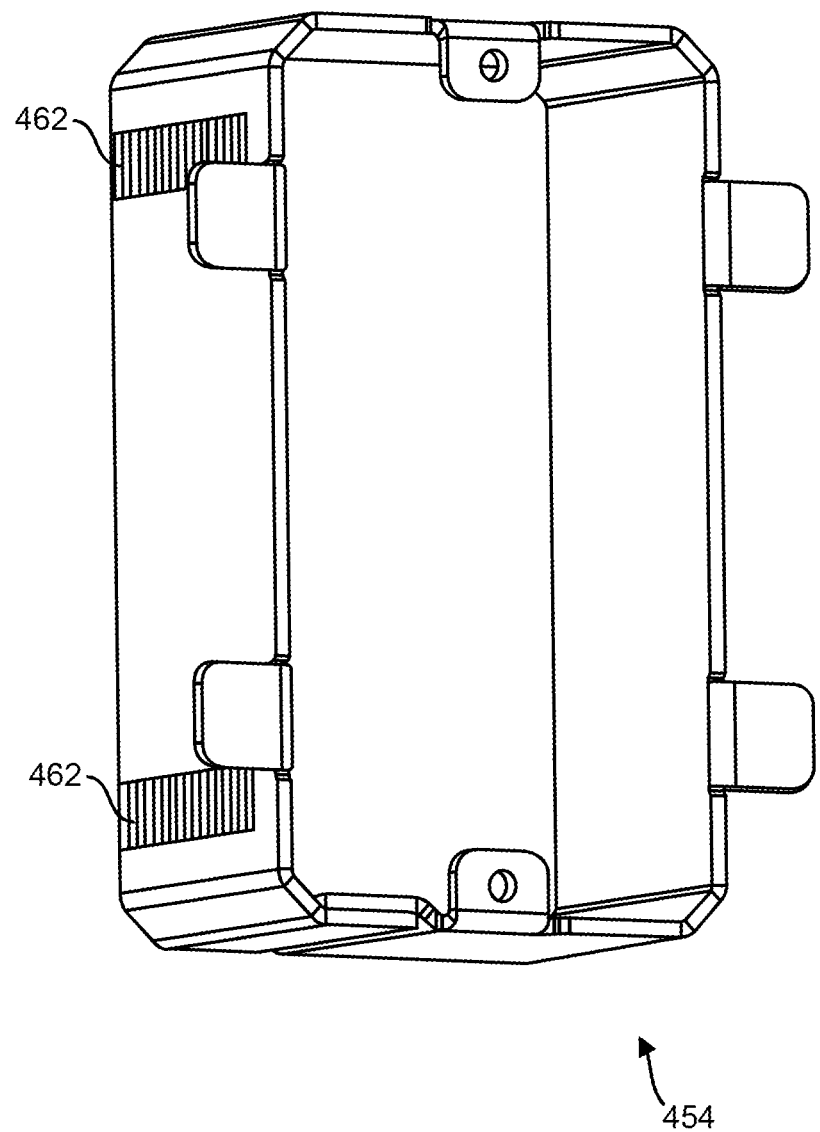
FIG. 32 is a perspective of the extension ring of the assembly in FIG. 27.
Figure 33:
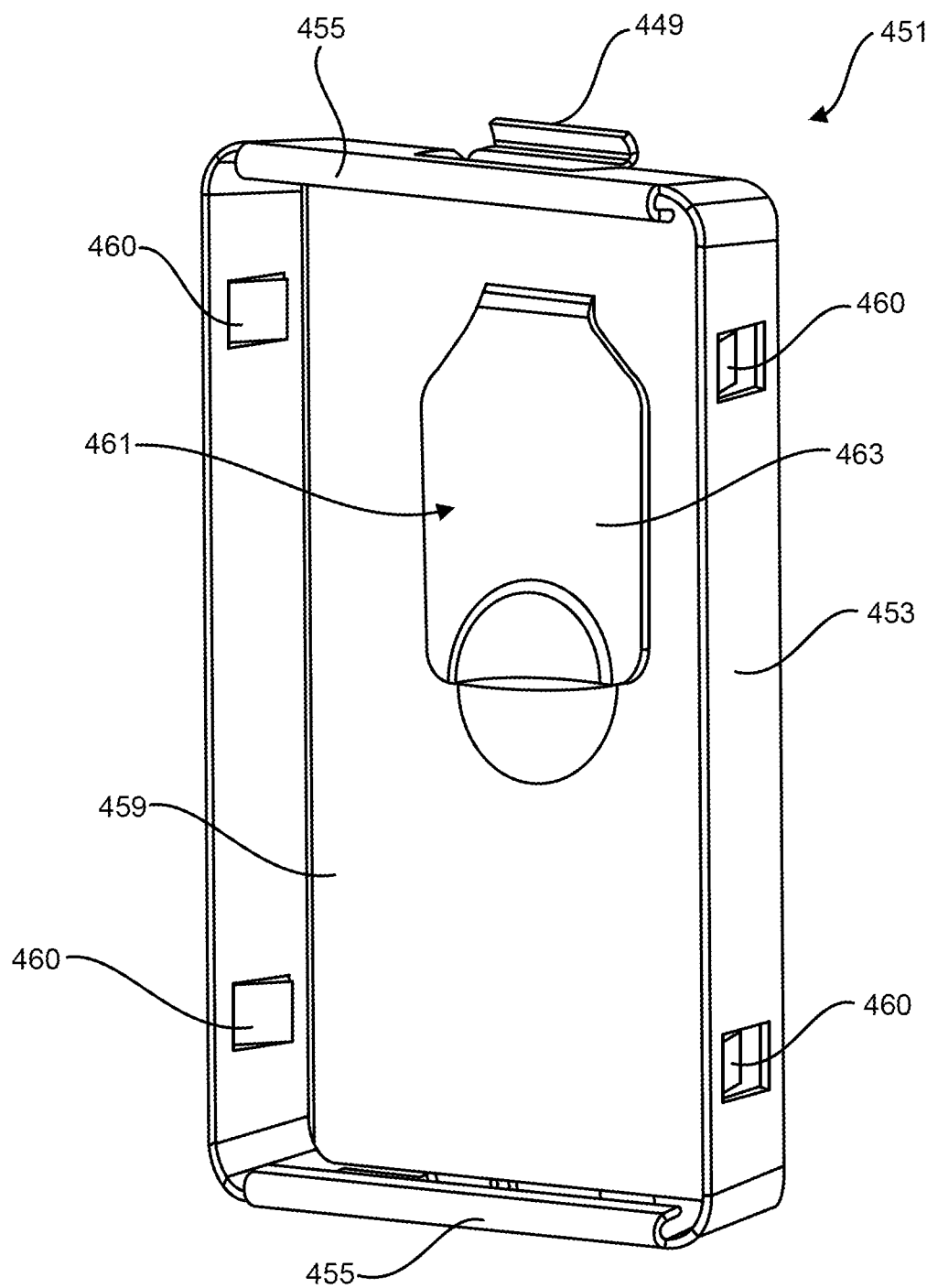
FIG. 33 is a front perspective of the cover of the assembly in FIG. 27.
Figure 34:
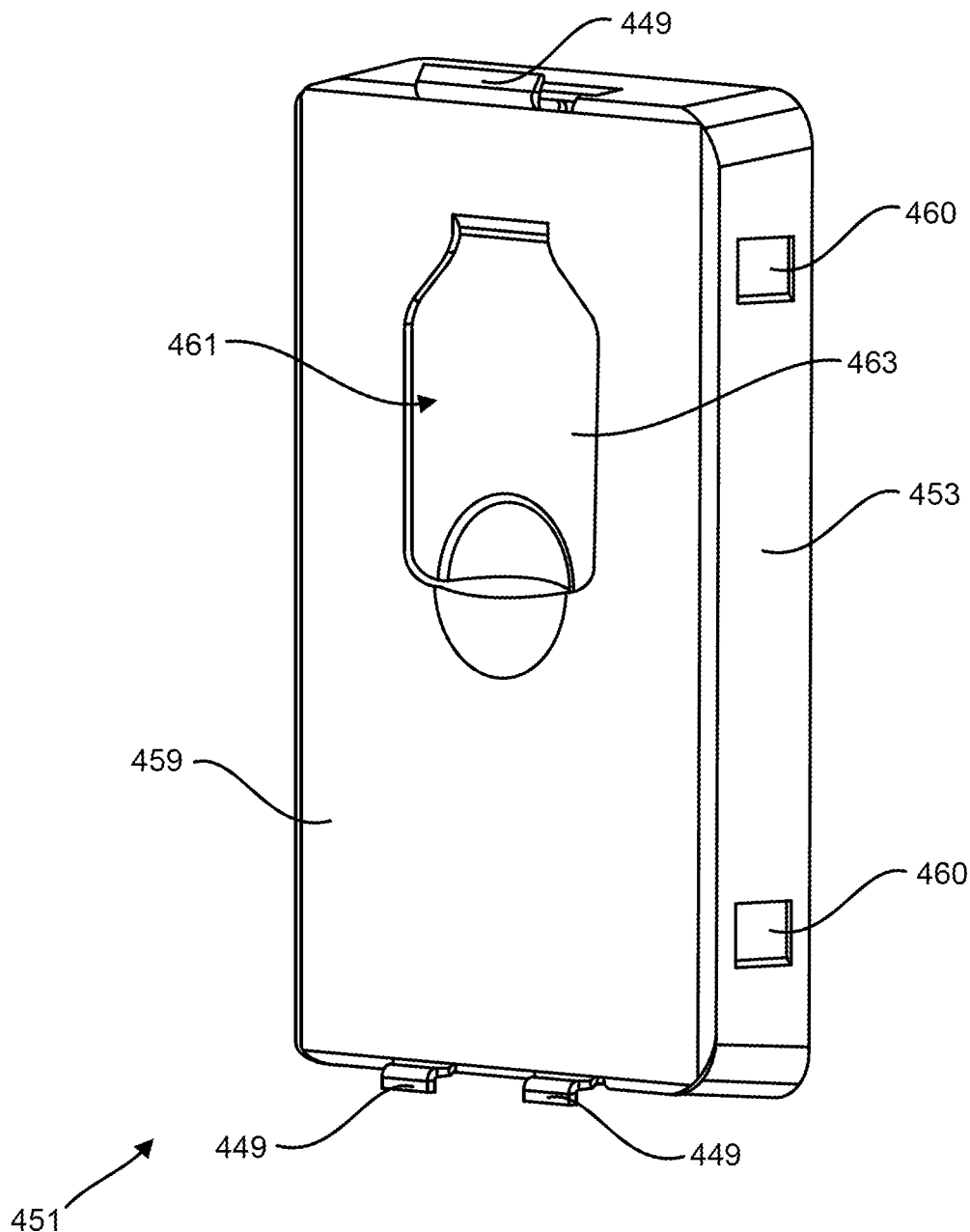
FIG. 34 is a rear perspective of the cover of the assembly in FIG. 27.

Referring to FIGS. 27-34, another embodiment of an adjustable-depth ring assembly is generally designated at 430. The assembly comprises a box cover plate 450 sized to fit the electrical box 36, a cover 451 attached to the box cover plate, and an extension ring 454 received in a central opening 457 of the cover when a face plate 459 of the cover is removed (FIGS. 30 and 31). The extension ring 454 is movable in the opening 457 relative to the cover 451 and box cover plate 450. Spring clips 460 extend from sides of the cover 451 and are configured for engaging grooves 462 on the extension ring 454. The spring clips 460 are operable to allow the extension ring 454 to be pushed in a rearward direction relative to the cover 451 and box cover plate 450 to an installed position in which the front of the extension ring is generally flush with a front surface of a wall member. The spring clips 460 are also operable to resist movement of the extension ring 454 in a forward direction away from the installed position.

Referring to FIGS. 28-34, the box cover plate 450 includes a flat generally planar rigid plate of suitable material (e.g., metal). The cover plate 450 defines a central opening 456. The cover 451 comprises a sleeve portion 453 (e.g., rectangular sleeve) attached to the box cover plate 450 and received in the central opening 456 of the box cover plate. In the illustrated embodiment, the cover 451 is snap fit onto the box cover plate 450 using hooks 449 at a top and bottom of the cover. The face plate 459 covers a back opening of the sleeve 453. The sleeve portion 453 of the cover 451 projects laterally (e.g., forwardly) from the box cover plate 450 and defines a channel for receiving the extension ring 454. In the illustrated embodiment, the cover 451 is formed separately from the box cover plate 450. However, the cover 451 could be formed integrally with the box cover plate 450. In the illustrated embodiment, the sleeve portion 453 is defined by a plurality of walls extending generally orthogonally to the box plate cover 450. Additionally, the top and bottom walls of the sleeve portion 453 include folded sections 455 which provide guide surfaces for positioning the extension ring 454 prior to inserting the ring into the sleeve portion of the cover 451. The spring clips 460 are punched from the side walls of the sleeve portion 453 and correspond to the grooves 462 on the extension ring 454 when the ring is positioned relative to the cover 451. In the illustrated embodiment, each side wall includes a pair of spring clips 460 positioned near a top and bottom of the sleeve portion 453, respectively. However, the spring clips 460 and grooves 462 could have other configurations and arrangements without departing from the scope of the disclosure.

This configuration configures the adjustable feature of the extension ring for use with a flat box plate cover 450. Additionally, the design allows for a surface connection for more shallow boxes and integrates the ratchet features on the cover 451 and extension ring 454 to reduce the number of parts of the assembly 430.

The face plate 459 of the cover 451 is configured to cover the central opening 456 in the box cover plate 450 prior to and during installation of the wall member (e.g., drywall). The face plate 459 is removable to expose the opening 456 for receiving the extension ring 554 in the sleeve portion 453 of the cover 451. A release mechanism 461 is provided on the face plate 459 of the cover 451 for removing the face plate from the cover. The release mechanism comprises a pull tab 463 attached to the face plate 459. The pull tab 463 is movable from a no-pull position (FIGS. 33 and 34) in which it is generally flush with a front wall of the face plate 459 and a pull position (not shown) in which it extends forward from the front wall so that it can be pulled to remove the face plate 459 from the cover 451. In the embodiment shown in the drawings, the pull tab 463 is formed as one piece with the face plate 459 and is bendable about a bend or hinge line adjacent the upper end of the pull tab for movement from its no-pull position and its pull position. The lower end of the pull tab 463 and an adjacent portion of the face plate 459 are configured to form a finger grip to facilitate moving the pull tab from its no-pull position to its pull position.

Figure 35:
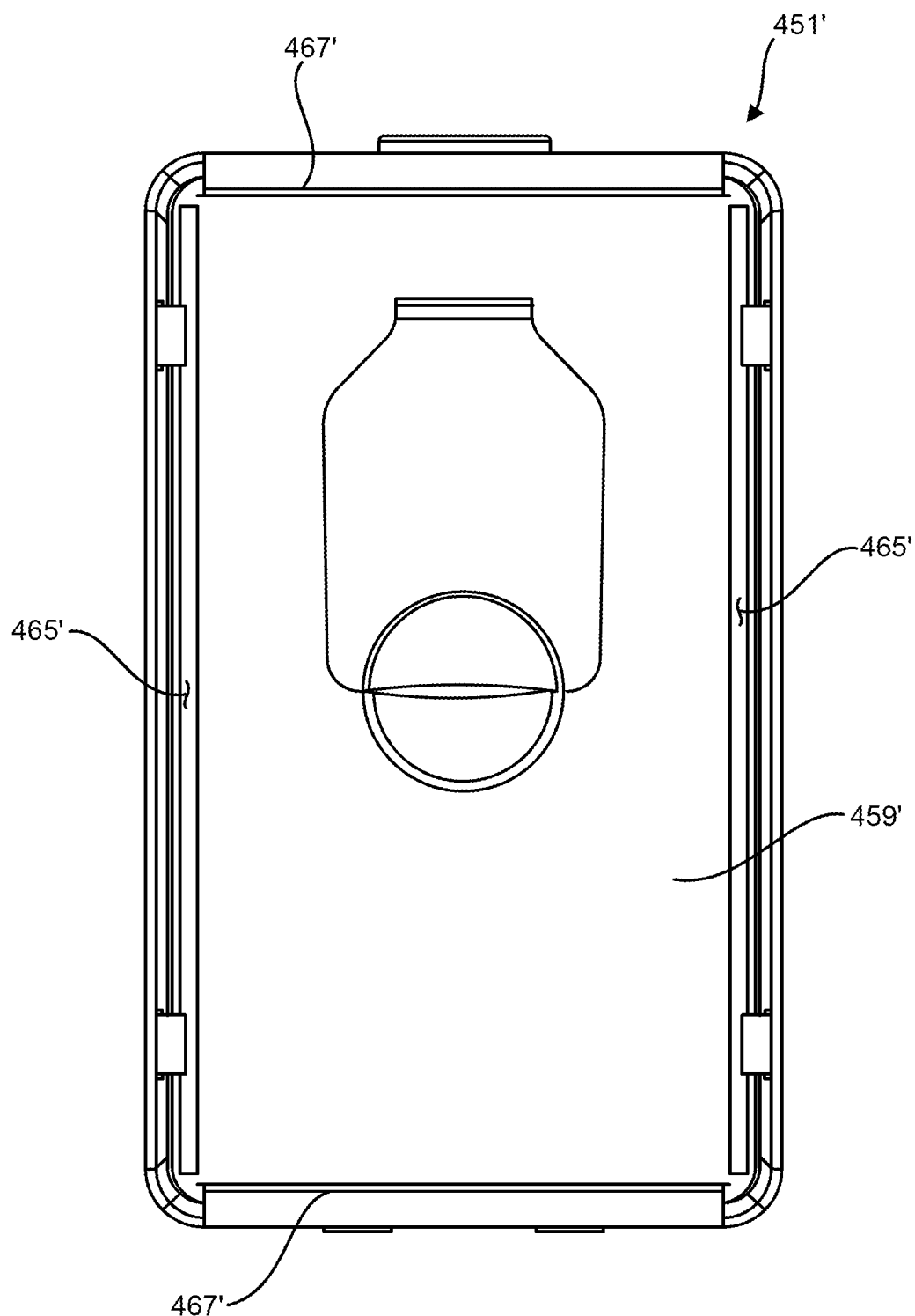
FIG. 35 is a front view of a cover of another embodiment.
Figure 36:
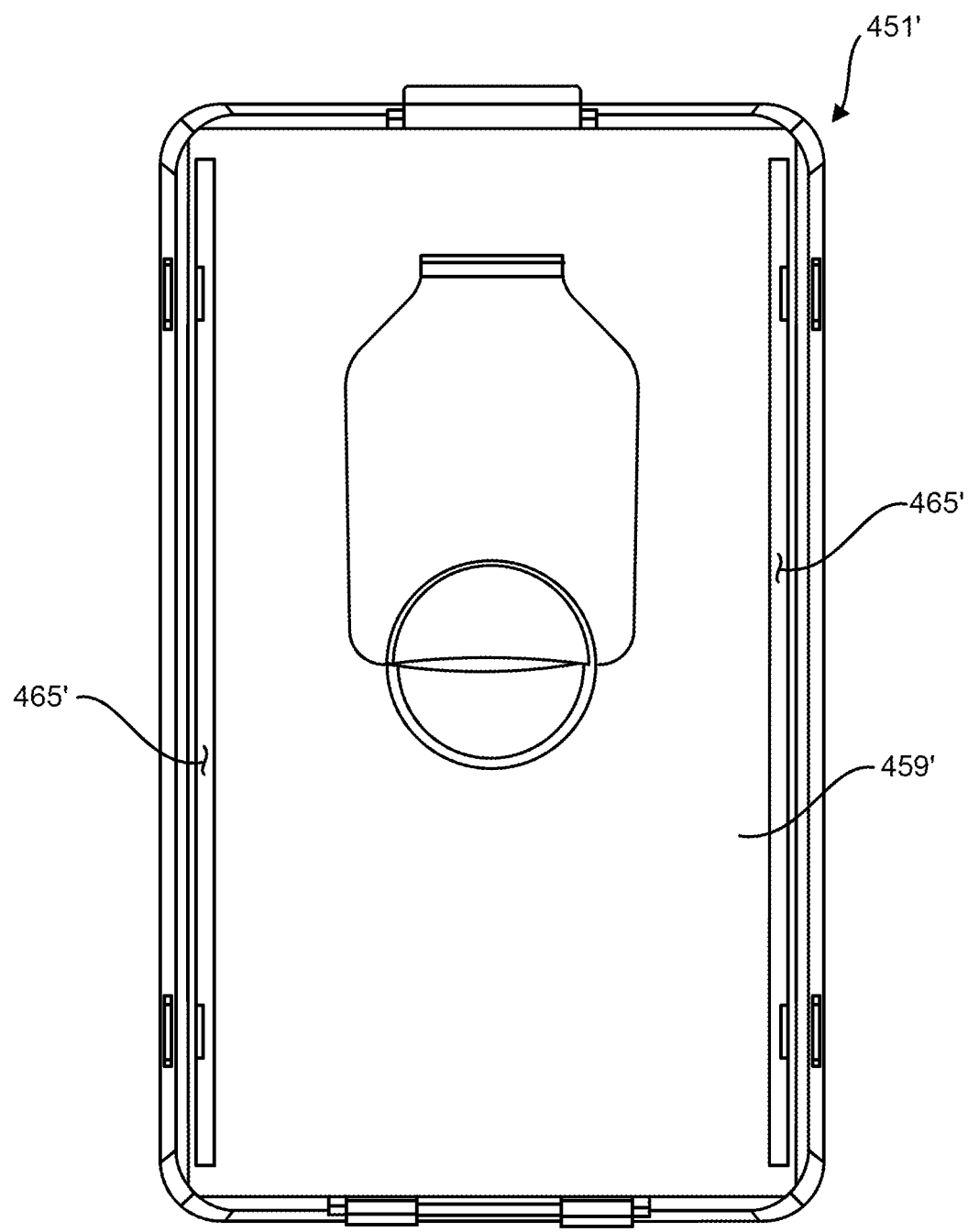
FIG. 36 a rear view of the cover in FIG. 35.

FIGS. 35 and 36 show an alternative cover 451' for use in the assembly 430. A face plate 459' of the cover 451' includes vertical slots 465' disposed as sides of the face plate, and horizontal slots 467' disposed at a top and bottom of the face plate. The slots 465', 467' provide frangible locations for assisting in the removal of the faceplate 459' from the cover 451'.

Referring to FIGS. 37-40, another embodiment of an adjustable-depth ring assembly is generally designated at 630. The assembly comprises a box cover plate 650 sized to fit the electrical box 36, a cover 651 attached to the box cover plate, and an extension ring 654 received in a central opening 657 of the cover when a face plate 659 of the cover is removed. The extension ring 654 is movable in the opening 657 relative to the cover 657 and box cover plate 650. Spring clips 660 extend from a top and bottom of the cover 651 and are configured for engaging grooves 662 on the extension ring 654. The spring clips 660 are operable to allow the extension ring 654 to be pushed in a rearward direction relative to the cover 651 and box cover plate 650 to an installed position in which the front of the extension ring is generally flush with a front surface of a wall member. The spring clips 660 are also operable to resist movement of the extension ring 654 in a forward direction away from the installed position.

Figure 39:
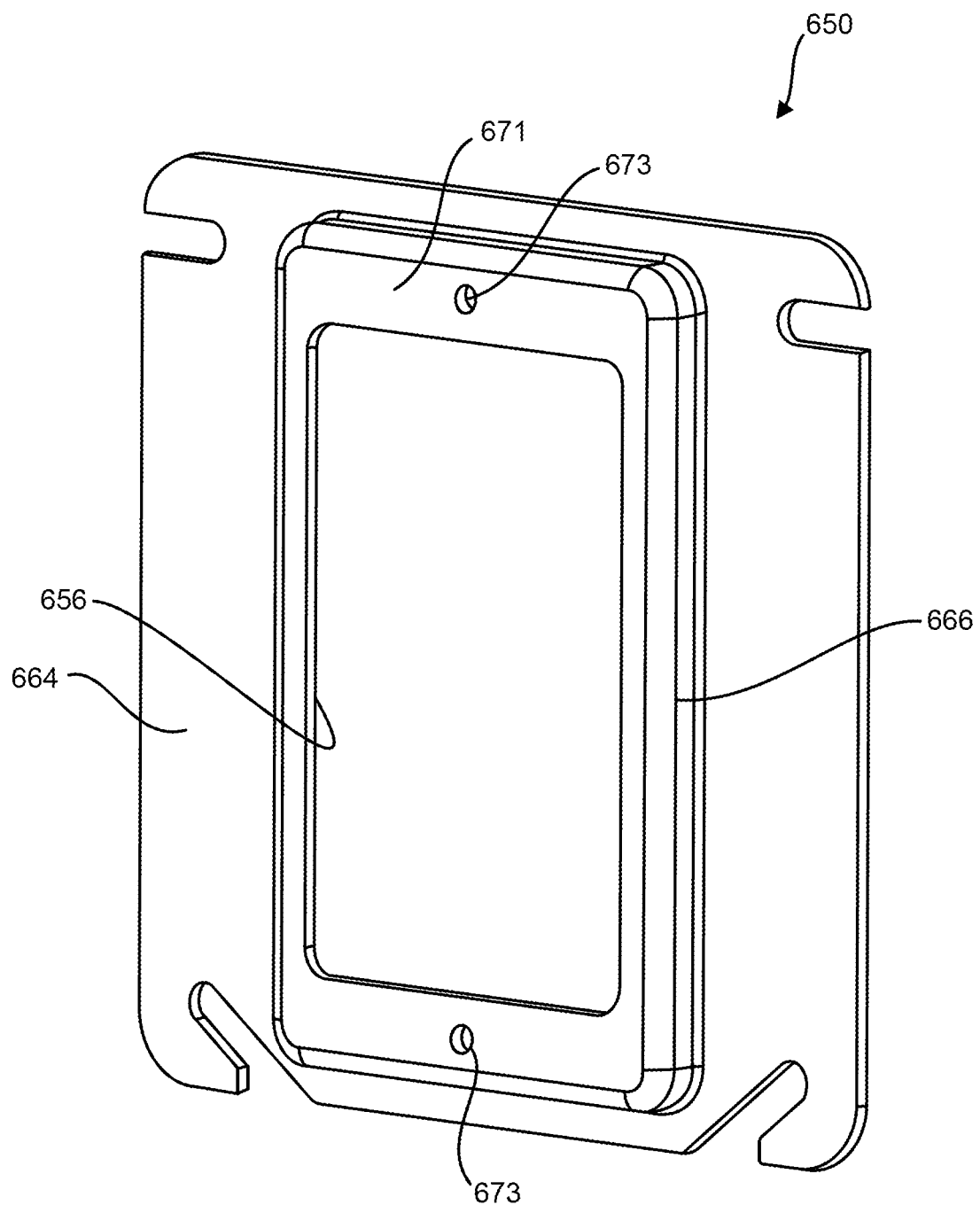
FIG. 39 is a perspective of a box cover plate of the assembly in FIG. 37.

Referring to FIG. 39, the box cover plate 650 includes a flat generally planar rigid plate 664 of suitable material (e.g., metal) and a raised portion 666 projecting laterally from the rigid plate and defining the central opening 656. A lip 671 of the raised portion 666 extends over the opening 656. Fastener holes 673 are formed in a top and bottom of the lip 671. In one embodiment, the box cover plate 650 is a standard plate used for fixed systems.

Figure 37:
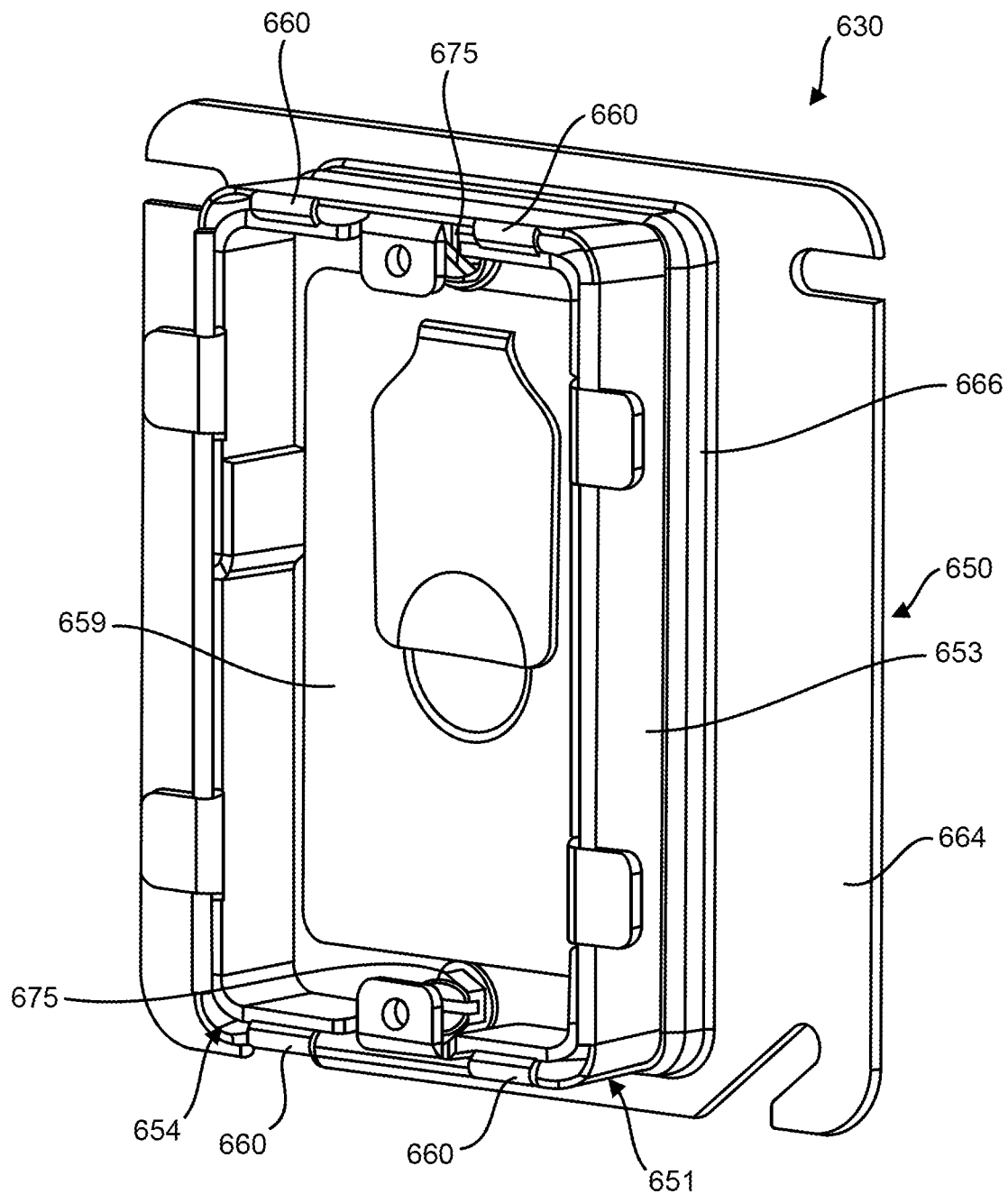
FIG. 37 is a perspective of another embodiment of an adjustable-depth ring assembly.
Figure 38:
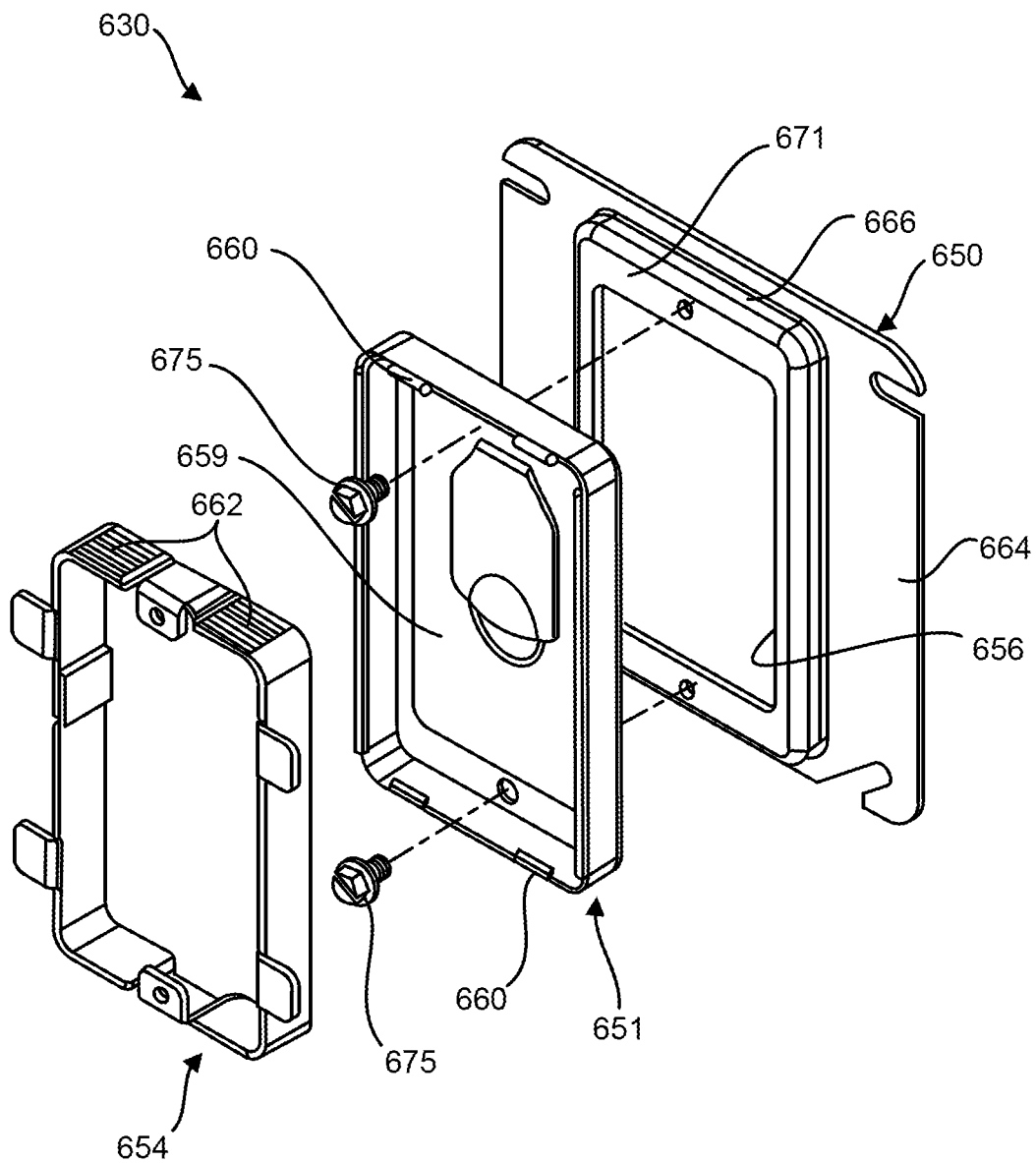
FIG. 38 is an exploded view of the assembly in FIG. 37.
Figure 40:
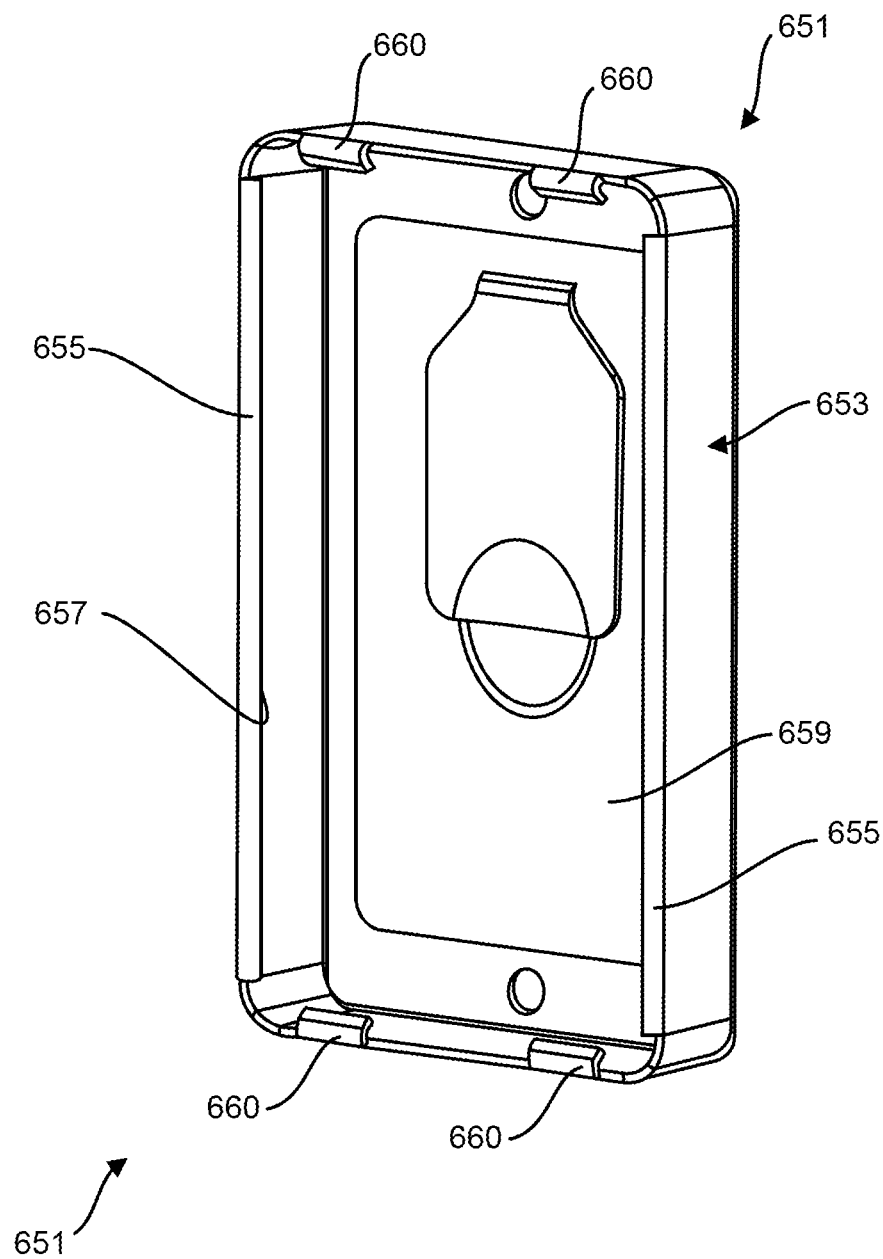
FIG. 40 is a perspective of a cover of the assembly in FIG. 37.

Referring to FIGS. 37, 38, and 40, the cover 651 comprises a sleeve portion 653 (e.g., rectangular sleeve) attached to the box cover plate 650 by fasteners 675. The fasteners extend through fasteners holes 677 in the sleeve portion 653 and through the fastener holes 673 in the raised portion 66 of the box cover plate 650 to attach the cover to the box cover plate. A face plate 659 covers a back opening of the sleeve 653. The sleeve portion 653 of the cover 651 projects laterally (e.g., forwardly) from the box cover plate 650 and defines a channel for receiving the extension ring 654. In the illustrated embodiment, the cover 651 is formed separately from the box cover plate 650. However, the cover 651 could be formed integrally with the box cover plate 650. The face plate 659 of the cover 651 is configured to cover the central opening 656 in the box cover plate 650 prior to and during installation of a wall member (e.g., drywall). As discussed above, the face plate 659 is removable to expose the opening 656 for receiving the extension ring 654 in the sleeve portion 653 of the cover 651.

Side walls of the sleeve portion 653 include folded sections 655 which provide guide surfaces for positioning the extension ring 654 prior to inserting the ring into the sleeve portion of the cover 651. The spring clips 660 extend from the top and bottom walls of the sleeve portion 653 and correspond to grooves 662 on the extension ring 654 when the ring is positioned relative to the cover 651. In the illustrated embodiment, the top and bottom wall each include a pair of spring clips 660 positioned near sides of the sleeve portion 653. However, the spring clips 660 and grooves 662 could have other configurations and arrangements without departing from the scope of the disclosure. This system allows for the standard box plate cover 650 to be retrofit with the cover 651 to configure the system 630 to be adjustable.

When introducing elements of the present invention or the preferred embodiments(s) thereof, the articles "a", "an", "the" and "said" are intended to mean that there are one or more of the elements. The terms "comprising", "including" and "having" are intended to be inclusive and mean that there may be additional elements other than the listed elements.

In view of the above, it will be seen that the several objects of the invention are achieved and other advantageous results attained.

As various changes could be made in the above constructions products without departing from the scope of the invention, it is intended that all matter contained in the above description and shown in the accompanying drawings shall be interpreted as illustrative and not in a limiting sense.

What is claimed is:

1. An adjustable-depth ring assembly for connection to an electrical box that is accessible through a wall opening in a wall member disposed forward of the electrical box, the adjustable-depth ring assembly comprising:
   a cover plate configured for attachment to the electrical box, the cover plate including a planar rigid plate and a raised portion projecting forward from the rigid plate and defining an opening;
   a spring clip attached to the cover plate, wherein the spring clip includes a pair of spring fingers received in the opening defined by the raised portion of the cover plate, each of the spring fingers having a clip portion; and
   an extension ring sized and shaped for reception in the opening of the cover plate and defining a cavity, wherein the extension ring has an exterior surface defining a plurality of grooves configured to selectively receive the clip portions of the spring fingers when the extension ring is received in the opening of the cover plate to couple the extension ring to the cover plate and enable the extension ring to be movable relative to the cover plate and the spring clip along an axis extending in front-to-back direction such that an axial distance between a front of the extension ring and the box cover plate can be adjusted to accommodate wall members of different thicknesses.

2. The assembly of claim 1, wherein the raised portion extends around an entirety of the opening.

3. The assembly of claim 1, wherein the raised portion comprises a plurality of continuous walls extending forward from the cover plate.

4. The assembly of claim 3, wherein each wall includes a curved portion extending from the planar rigid plate and a planar portion extending from the curved portion.

5. The assembly of claim 3, wherein rounded corners connect adjacent walls such that the walls define a curved track around the opening.

6. The assembly of claim 1, wherein each spring clip includes a guide portion configured to engage the extension ring for guiding movement of the extension ring relative to the cover plate.

7. The assembly of claim 1, wherein the grooves on the exterior surface of the extension ring are disposed on a top or bottom portion of the exterior surface of the extension ring.

8. The assembly of claim 1, wherein the extension ring includes a top, a bottom, and sides extending between the top and bottom, at least one tab extending laterally from each side of the extension ring, the tabs being configured to engage a front of the wall member when the extension ring is received in the cover plate.

9. The assembly of claim 1, wherein the raised portion projects forward to a plane offset from the planar rigid plate, wherein each of the pair of spring fingers has an extension portion extending forward between the raised portion of the cover plate and the extension ring in the opening defined by the raised portion of the cover plate.

10. The assembly of claim 1, wherein the planar rigid plate of the cover plate has a front surface and rear surface, wherein the spring clip is attached to the rear surface of the planar rigid plate.

11. A method of installing the adjustable-depth ring assembly of claim 1, comprising:
    attaching the cover plate to an electrical box, said electrical box and cover plate being disposed behind said wall member such that the raised portion of the box cover plate presses against an inner surface of the wall member producing a bulging area of the wall member; and
    cutting a hole in the wall member around the bulging area of the wall member to expose the opening of the cover plate.

12. The method of claim 11, wherein cutting the hole in the wall member comprises engaging a cutting tool with the raised portion of the cover plate to guide cutting around the bulging area.

13. The method of claim 12, further comprising connecting the extension ring to the box cover plate by pushing the extension ring in a rearward direction into the opening in the cover plate to an installed position in which tabs of the extension ring contact a front surface of the wall member.

14. The method of claim 11, wherein the extension ring is inhibited from moving in a forward direction relative to the cover plate by the spring clip.

15. A box cover plate assembly for use in an adjustable-depth ring assembly for connection to an electrical box that is accessible through a wall opening in a wall member disposed forward of the electrical box, the box cover plate assembly comprising:
    a planar rigid plate defining holes for receiving fasteners for attaching the box cover plate to the electrical box; and
    a cover attachable to the planar rigid plate, the cover comprising a sleeve portion projecting forward from the planar rigid plate when the cover is attached to the planar rigid plate, and a removable faceplate extending across a back of the sleeve portion.

16. The assembly of claim 15, wherein the cover is attached to the planar rigid plate by one of a snap-fit connection and fasteners.

17. The assembly of claim 16, wherein the sleeve portion of the cover includes spring clips extending from the sleeve portion.

18. The assembly of claim 17, wherein the sleeve portion includes top and bottom walls having rounded front ends.

19. The assembly of claim 17, in combination with an extension ring configured for coupling to the sleeve portion of the cover.

20. The assembly and extension ring of claim 19, wherein the extension ring includes grooves for being engaged by the spring clips on the cover when the extension ring is coupled to the cover.

* * * * *